US012594635B2

(12) United States Patent
Larkin

(10) Patent No.: US 12,594,635 B2
(45) Date of Patent: Apr. 7, 2026

(54) ROUTER SLED

(71) Applicant: Kenneth E. Larkin, Tuscon, AZ (US)

(72) Inventor: Kenneth E. Larkin, Tuscon, AZ (US)

(73) Assignee: Kenneth E. Larkin, Tuscon, AZ (US)

( * ) Notice: Subject to any disclaimer, the term of this patent is extended or adjusted under 35 U.S.C. 154(b) by 0 days.

(21) Appl. No.: 17/464,060

(22) Filed: Sep. 1, 2021

(65) Prior Publication Data

US 2023/0064921 A1 Mar. 2, 2023

(51) Int. Cl.
*B23B 5/40* (2006.01)
*B23Q 9/00* (2006.01)

(52) U.S. Cl.
CPC .............. *B23Q 9/0078* (2013.01); *B23B 5/40* (2013.01)

(58) Field of Classification Search
CPC .. B23B 3/00; B23B 3/06; B23B 3/065; B23B 3/16; B23B 3/161–168; B23B 3/22; B23B 3/26; B23B 5/40; B27C 7/00; B27C 7/005; B27C 7/02; B27C 7/06; B27C 5/10; B23Q 9/0078
See application file for complete search history.

(56) References Cited

U.S. PATENT DOCUMENTS

| | | | | | |
|---|---|---|---|---|---|
| 39,817 | A | * | 9/1863 | Johnson | B23B 5/40 82/12 |
| 93,492 | A | * | 8/1869 | Spencer | B27C 7/00 144/150 |

| | | | | | |
|---|---|---|---|---|---|
| 125,571 | A | * | 4/1872 | Hyatt, Jr. | B23B 5/40 82/12 |
| 203,515 | A | * | 5/1878 | Wheeler | B27C 7/005 142/41 |
| 437,157 | A | * | 9/1890 | Honeyman | B23B 39/02 408/133 |
| 1,171,123 | A | * | 2/1916 | Himoff | B23Q 11/0017 408/237 |
| 1,272,108 | A | * | 7/1918 | Robb et al. | B25H 1/0042 408/136 |
| 1,338,456 | A | * | 4/1920 | Jacobson | B23Q 37/00 29/27 C |
| 1,361,664 | A | * | 12/1920 | Ashman | B25H 1/0078 408/111 |
| 1,417,521 | A | * | 5/1922 | Haumann | B23B 3/02 82/149 |
| 1,484,286 | A | * | 2/1924 | Alber | B27C 7/005 142/50 |

(Continued)

FOREIGN PATENT DOCUMENTS

| | | | |
|---|---|---|---|
| CN | 102366889 | B | 8/2013 |
| CN | 206748634 | U * | 12/2017 |

(Continued)

OTHER PUBLICATIONS

CN-108145802-A Machine Translation (Year: 2022).*

(Continued)

*Primary Examiner* — Nicole N Ramos
(74) *Attorney, Agent, or Firm* — Merchant & Gould P.C.

(57) ABSTRACT

A router sled for woodworking. The router sled includes a router, a housing for holding the router, the router being slidably mounted to a rail. The rail being defined on a platform. The housing is slidably mounted to the rail. The housing slides with the router along the rail.

5 Claims, 27 Drawing Sheets

(56) References Cited

U.S. PATENT DOCUMENTS

| | | | | |
|---|---|---|---|---|
| 1,493,142 A * | 5/1924 | Bodmer | B25H 1/0042 | 81/34 |
| 1,852,736 A * | 4/1932 | Connell | B25H 1/0021 | 470/181 |
| 2,534,333 A * | 12/1950 | Wyrick | B23B 29/242 | 82/159 |
| 2,760,397 A * | 8/1956 | Arpin | B23Q 5/34 | 82/132 |
| 2,783,664 A * | 3/1957 | Johnson | B23Q 16/006 | 29/45 |
| 2,925,001 A * | 2/1960 | Johnson | B27C 3/08 | 408/712 |
| 2,973,673 A * | 3/1961 | Grau | B25H 1/0064 | 408/712 |
| 3,258,997 A * | 7/1966 | Krisovitch | B23B 43/02 | 82/132 |
| 3,316,946 A * | 5/1967 | May | B27C 9/02 | 142/38 |
| 3,988,814 A * | 11/1976 | Hoffman | B23C 1/06 | 29/27 A |
| 4,000,766 A | 1/1977 | Sutcliffe | | |
| 4,051,751 A * | 10/1977 | Estrada | B23Q 1/48 | 82/12 |
| 4,301,699 A * | 11/1981 | Butler | B23Q 5/043 | 409/185 |
| 4,608,889 A * | 9/1986 | Kollar | B27C 7/06 | 142/7 |
| 4,669,929 A * | 6/1987 | Olesen | B25H 1/0064 | 408/100 |
| 4,719,676 A * | 1/1988 | Sansone | B23B 3/30 | 29/33 J |
| 4,740,119 A * | 4/1988 | Lierz | B25H 1/0064 | 74/105 |
| 5,333,657 A | 8/1994 | Hart | | |
| 6,374,878 B1 * | 4/2002 | Mastley | B25H 1/0078 | 144/135.2 |
| 7,849,769 B2 * | 12/2010 | Akiyama | B23B 5/48 | 82/159 |
| 8,387,493 B2 * | 3/2013 | Monroe | B23Q 1/015 | 82/149 |
| 9,475,207 B2 | 10/2016 | Webber | | |
| 2003/0070727 A1 * | 4/2003 | Stephens | B25H 1/0021 | 144/1.1 |
| 2008/0314211 A1 * | 12/2008 | Clay | B23B 3/06 | 82/149 |
| 2018/0043439 A1 * | 2/2018 | Suhling | B25B 1/205 | |

FOREIGN PATENT DOCUMENTS

| | | | | | |
|---|---|---|---|---|---|
| CN | 108145802 A | * | 6/2018 | | B01D 50/006 |
| CN | 207522757 U | * | 6/2018 | | |
| DE | 2238020 A | * | 4/1974 | | B24B 11/00 |
| EP | 0609573 A1 | * | 8/1994 | | |
| EP | 3795314 A1 | * | 3/2021 | | |
| FR | 2552010 A1 | | 3/1985 | | |
| GB | 2091617 A | | 8/1982 | | |
| GB | 2230725 A | | 10/1990 | | |
| GB | 2311241 A | * | 9/1997 | | B23Q 35/102 |
| WO | 1992015433 A1 | | 9/1992 | | |
| WO | 9727017 A1 | | 7/1997 | | |

OTHER PUBLICATIONS

CN 206748634 U Machine Translation (Year: 2022).*
CN 207522757 U Machine Translation (Year: 2022).*
Additional Machine Translation of CN'206748634 U (Year: 2023).*
Screen captures from YouTube video clip entitled "Релаксационные шары, на шароточке —JIB WL 330" which translates as Relaxation balls, ball-bearing—JIB WL 330; 29 pages, uploaded on Mar. 11, 2018 by user "Иван Баев-Ivan Baev". Retrieved from Internet: <https://www.youtube.com/watch?v=HOdV65GjzxA>. (Year: 2018).*
Screen captures from YouTube video clip entitled "Come realizzare sfere in legno—How to Make Wooden Balls" 15 pages, uploaded on Nov. 17, 2018 by user "Jacopo Chiumento". Retrieved from Internet: <https://www.youtube.com/watch?v=zHAxr7oYJmw>. (Year: 2018).*
WoodWorkWeb, YouTube video, "Making Wooden Balls/Spheres On the Lathe With a Drill," Uploaded Sep. 14, 2018, https://www.youtube.com/watch?v=6mU6osNjfXc.

* cited by examiner

100

116

116b

116a

116b

112b

118

118a

110d

110b

110g

310

ROUTER SLED

TECHNICAL FIELD

The present disclosure relates generally to wood working devices.

BACKGROUND

Woodworking has existed for thousands of years. Around 1300 B.C.E, it is thought that Egyptians developed a wood turning device that was a two-person lathe used to turn bows. Since the advent of wood turning, there have been many large improvements. Modern lathes are high powered devices which use powerful motors to turn wood.

It is considered desirable for wood features to have decorative features such as spherical shaped cut-outs throughout turned wood. It can be difficult to create such decorative features with consistency, especially inexpensively or for novice wood workers.

Routers are a commonly used tool that can be used to make patterns in wood but can be difficult to use with consistency. Improvements are desired.

SUMMARY

Aspects of the present disclosure relate to woodworking devices. More specifically, the present disclosure relates to a router sled for sliding a router. The router sled can be used to create a consistent, repeatable pattern for users both experienced and unexperienced.

The router sled includes a housing configured to hold the router. The housing is slidably mounted to a rail and configured to slide axially along the rail along a rail axis. The rail is defined by a platform. The platform extends between a first end and a second end along a platform axis, and the platform includes a mounting location to mount the platform to a device. The router comprises a motor which is configured to rotate a shaft, the shaft has a collet, the collet is attached to the router.

In some examples, the housing includes a first side and a second side, the second side of the housing including an opening that extends from a first face of the housing to a second face of the housing and is configured to slidably mate with the rail.

In some examples, the opening is shaped as a dovetail and the rail is shaped as a dovetail which complements the opening and allows the housing to slidably connect to the rail.

In some examples, the housing is formed from a first housing piece and a second housing piece.

In some examples, the first housing piece and the second housing piece each have a first face and a second face as well as a first side and a second side, wherein the first sides of each of the first housing piece and the second housing piece meet at an interface.

In some examples, the second side of the second housing piece includes an opening that extends from the first side to the second side and is configured to slidingly attach to the rail.

In some examples, a chuck is attached to the collet. In some examples, a blade is attached to the chuck.

In some examples, the device to which the router sled is mounted is a lathe, the lathe includes a chuck and a tailstock with a workpiece mounted between the chuck and the tailstock along a workpiece axis. In some examples, the router sled is mounted such that the rail axis is perpendicular to the workpiece axis.

In some examples, the housing includes a handle configured to slidably move the router and the router housing along the rail axis.

Another aspect of the present disclosure relates to a mechanism for cutting spheres on a workpiece mounted to a lathe, the lathe including a chuck and a tailstock, the workpiece being mounted between the chuck and the tailstock extending along a workpiece axis, and the chuck is configured to turn the workpiece. The mechanism includes a platform, the platform extending along a platform axis between a first end and a second end, the platform including a rail that extends along the platform axis. The platform is mounted to the lathe such that the workpiece axis is perpendicular to the platform axis. The mechanism additionally includes a router which includes a motor that rotates a shaft which is attached to a blade, the router being slidably mounted to the rail using a router mount and configured to slide axially along the platform axis. The rail extends up to the lathe and at least up to a length at which the blade of the router can reach a predetermined length of the workpiece. The router is then configured to slide up to the lathe and is configured to cut a sphere out of the workpiece with the blade when the lathe is turning the workpiece and the router is slid towards the lathe.

In some examples, the blade is a circular shape.

In some examples, the blade is removably attached to the shaft.

In some examples, the router mount includes a handle which is configured to allow an operator to slide the router mount.

In some examples, a bit is attached to the shaft to create holes about the workpiece. In some examples, the holes are made at various angles. In some examples, the holes are equally spaced from one another.

In some examples, the diameter of the router further comprises a collet which is configured to be rotated with the shaft and the motor. The collet includes a tightening nut which attaches a router chuck to the router. The router chuck is attached to a grasping bit, and the grasping bit includes a fitting which is configured to attach the blade to the router.

In some examples, the router mount is formed from a first piece and a second piece, the first and second pieces each including a first side and a second side as well as a first face and a second face, the first sides of each of the first and second pieces facing one another at an interface, and the second piece including an opening on the second side that extends from the first face of the router mount to the second side of the router mount. In some examples, the opening is shaped as a dovetail. In some examples, the rail is shaped as dovetail which corresponds to the opening.

In some examples, the predetermined length at which the rail extends up determines the depth which the sphere is cut into the workpiece.

The present disclosure additionally relates to a method of creating a sphere on a workpiece including the steps of: turning the workpiece using the lathe, beginning to slide the router along the rail towards the workpiece such that the blade of the router engages with the workpiece, and sliding the router along the rail until the blade of the router has reached a desired depth resulting in a sphere in the workpiece. In some examples, holes can be made in the workpiece after the sphere is made using a bit.

In some examples, the router mount includes a handle, the handle is pivotally mounted to the rail and the handle can be pushed to a predetermined distance and the router mount moves with the router as the handle moves.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
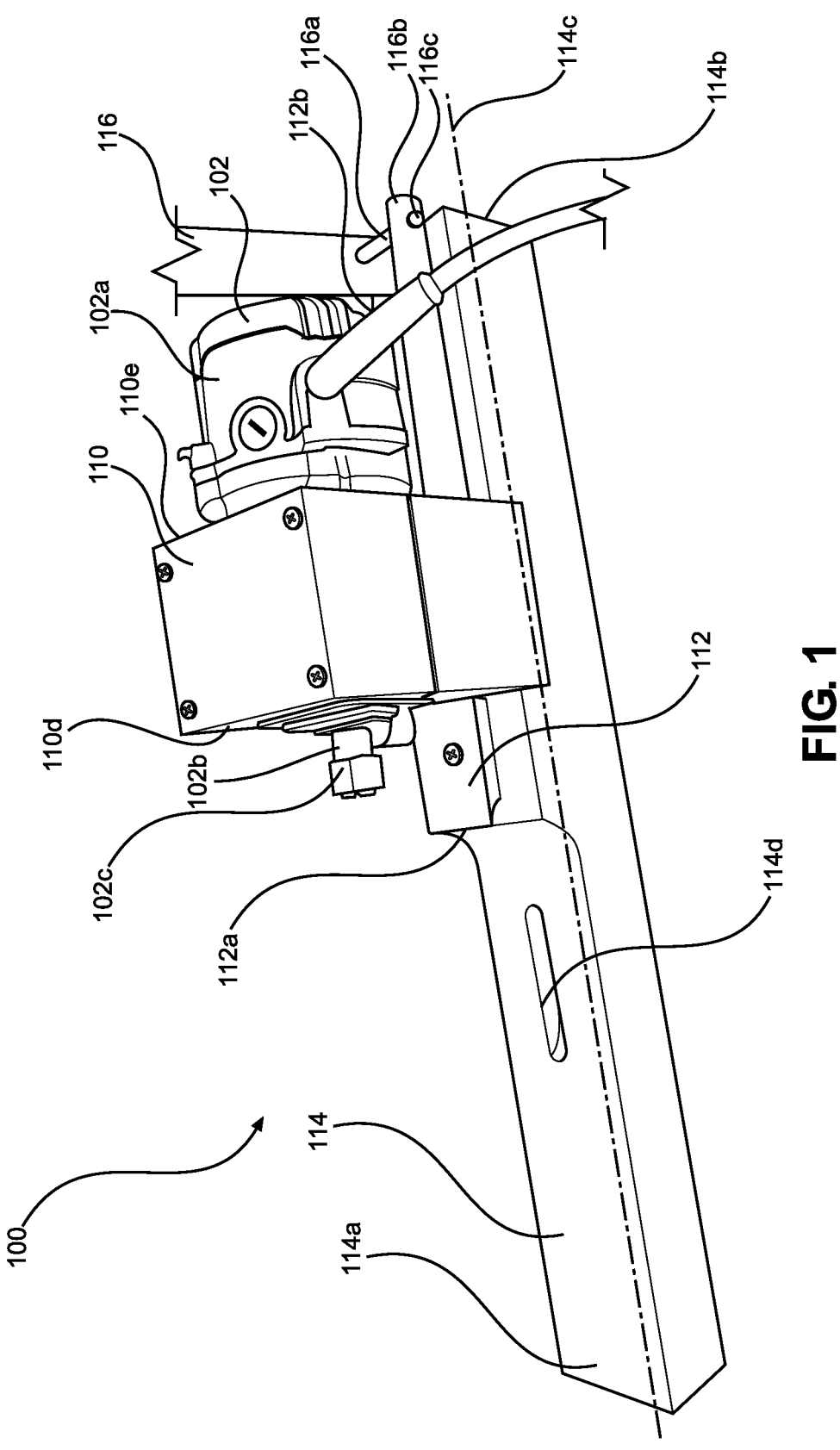
FIG. 1 is an isometric view of a router sled in accordance with the principles of this disclosure, including a router and a housing mounted to a platform with a rail defined by the platform.
Figure 2:
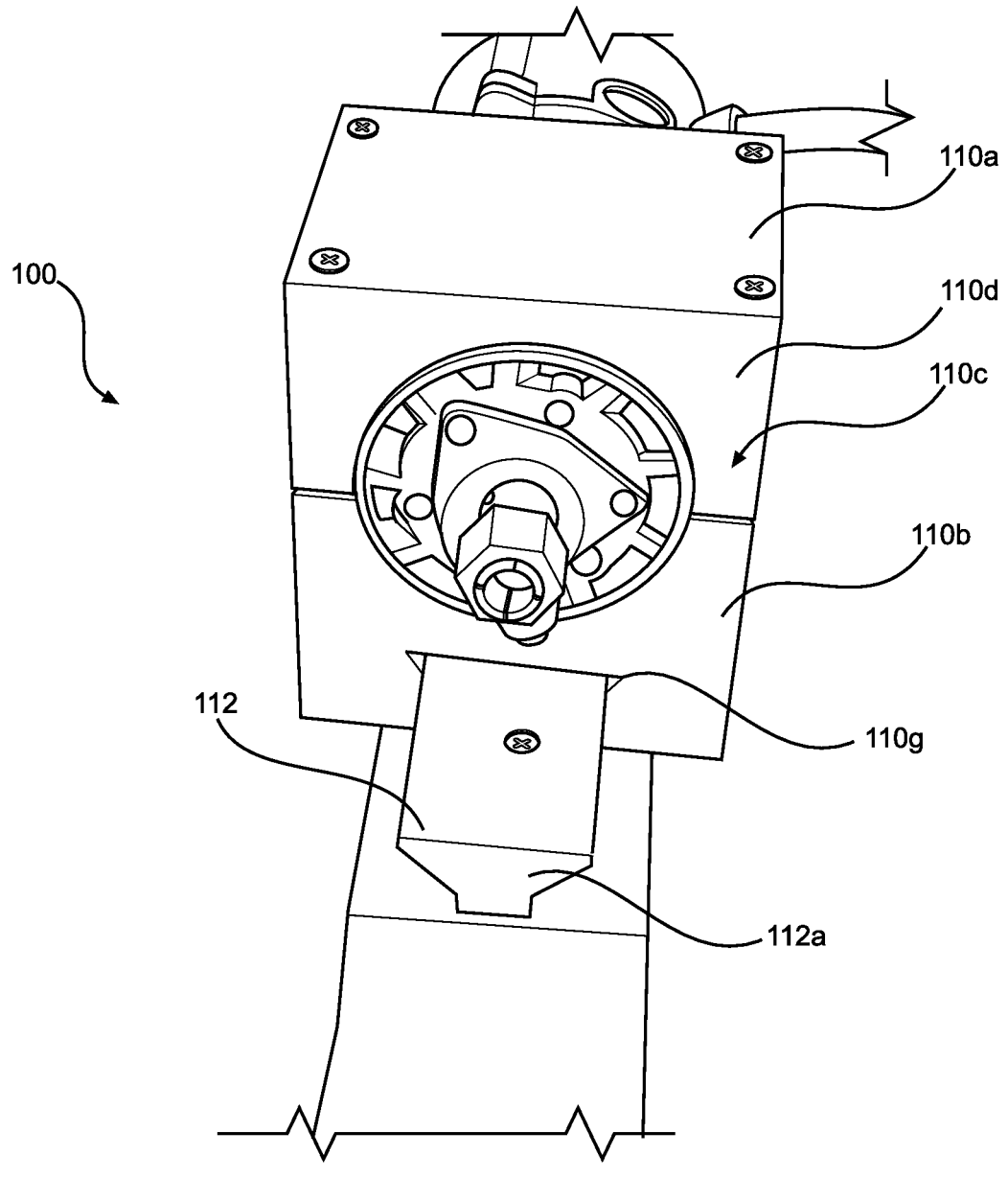
FIG. 2 is a front view of the router sled of FIG. 1.
Figure 3:
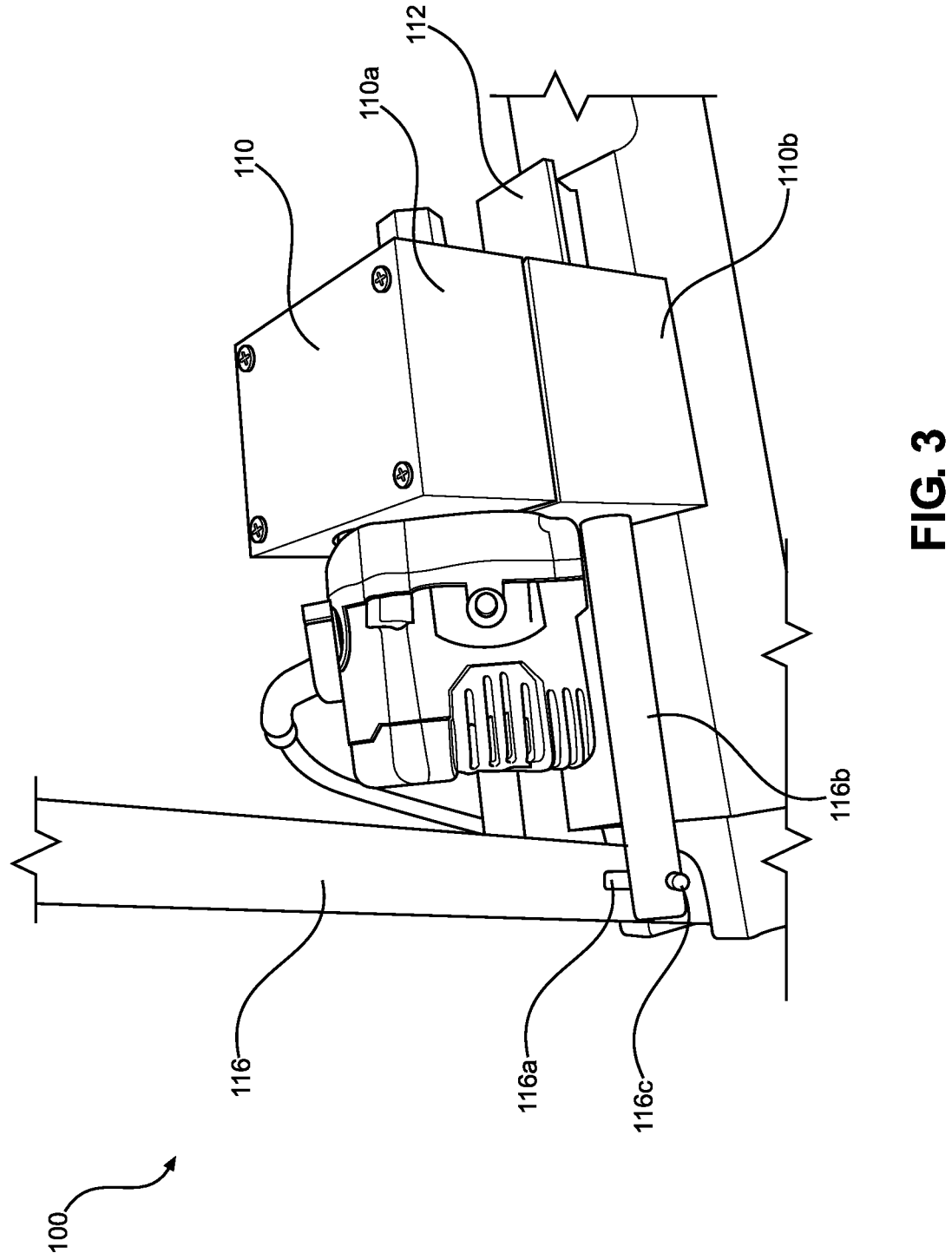
FIG. 3 is a first side view of the router sled of FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Aspects of the present disclosure relate to woodworking systems for creating designs, features, ornamental features, or functional features on a workpiece. More particularly, the present disclosure relates to a router sled for sliding a router. In some examples, devices similar to routers can be used (e.g., drills, or other devices which include a shaft or spindle is driven by a motor; throughout the rest of the disclosure router is used as general term).

Referring now to FIGS. 1 through 4, a router sled 100 for sliding a router 102 is shown. The router sled 100 includes a housing 110. The housing 110 is configured to hold the router 102. The housing 110 can include a first piece 110a and a second piece 110b. The first and the second pieces 110a, 110b include a holder 110c, and the holder 110c is defined on a first face 110d of the housing 110 and extends to a second face 110e of the housing 110. The router 102 is held in the holder 110c. In one aspect, the holder 110c has a shape complementary to the shape of the router 102. In this embodiment, the holder 110c is circular, but the shape can be different depending on the router 102 as well as other factors. The housing 110 is configured to slidably mount to a rail 112 formed from a platform 114. The platform 114 extends between a first end 114a and a second end 114b along a platform axis 114c. The router 102 includes a motor 102a. The motor 102a is configured to rotate a shaft 102b to which a collet 102c is attached.

The rail 112 is configured to slidably mate with the housing 110. The housing 110, in this embodiment, includes a channel or opening 110g. The opening 110g is most easily seen in FIG. 2 while the housing 110 is seen most easily in FIGS. 18-20. In one aspect, the opening 110g has a complementary shape to the profile of the rail 112. In this embodiment, the profile of the rail 112 is shaped as a dovetail and the opening 110g is also shaped as a dovetail. The rail 112 extends parallel to the platform axis 114c along a rail axis between a first end 112a and a second end 112b. In this particular embodiment, the opening 110g is on the second piece 110b of the housing 110. Other configurations are possible, for example the channel or opening could be provided as part of the rail 112 and a projection could be provided on the housing 110.

Figure 4:
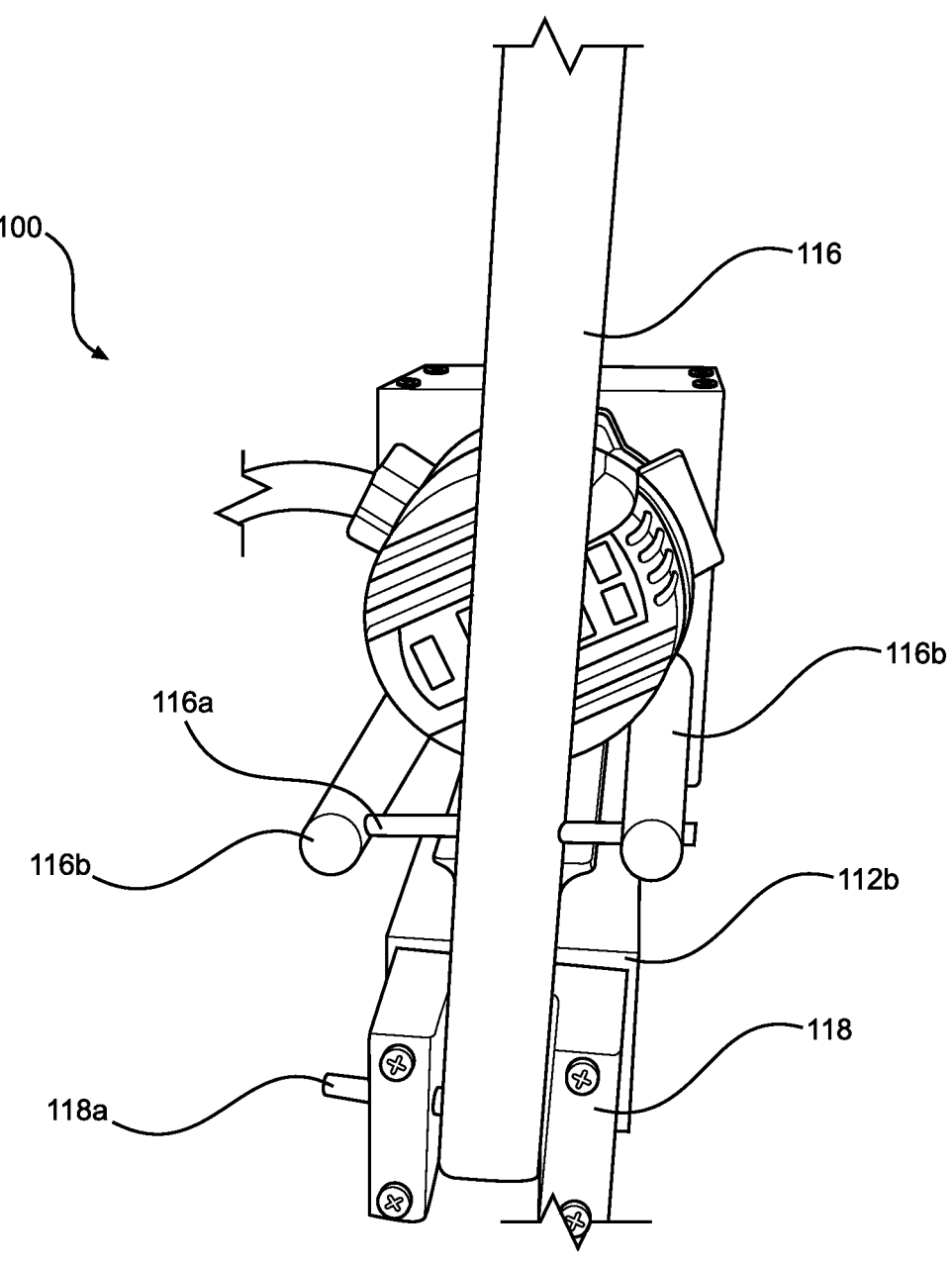
FIG. 4 is a rear view of the router sled of FIG. 1.

In this embodiment, the router sled 100 includes a handle 116. The handle 116 is mounted to the housing 110 and can be used by an operator to move the housing 110 along the rail 112. In one aspect, the handle 116 is pivotable. FIG. 4 shows a handle holder 118 that includes a handle holder pin 118a about which the handle 116 pivots. The handle 116 is configured to move the housing 110 a predetermined length along the rail 112. The handle 116 is attached to the housing 110 with handle arms 116b. The handle arms 116b are attached to one another and the handle 116 through a handle pin 116a, as can be seen most easily at FIG. 4. In this embodiment, the handle arms 116b connect to the housing 110 below the holder 110c on the second piece 110b of the housing 110. The handle arms 116b include openings 116c within which the handle pin 116a attaches. The handle arms 116b move axially with the housing 110 along the rail axis as the handle 116 pivots. The handle 116 is positioned at the second end 112b of the rail 112. In some examples, the predetermined length is the length of the rail 112 (e.g., the length between the first and the second ends 112a, 112b of the rail). Other embodiments of the handle 116 that do not pivot are possible. Moving the housing 110 freely without having a predetermined length is also possible.

Figure 5:
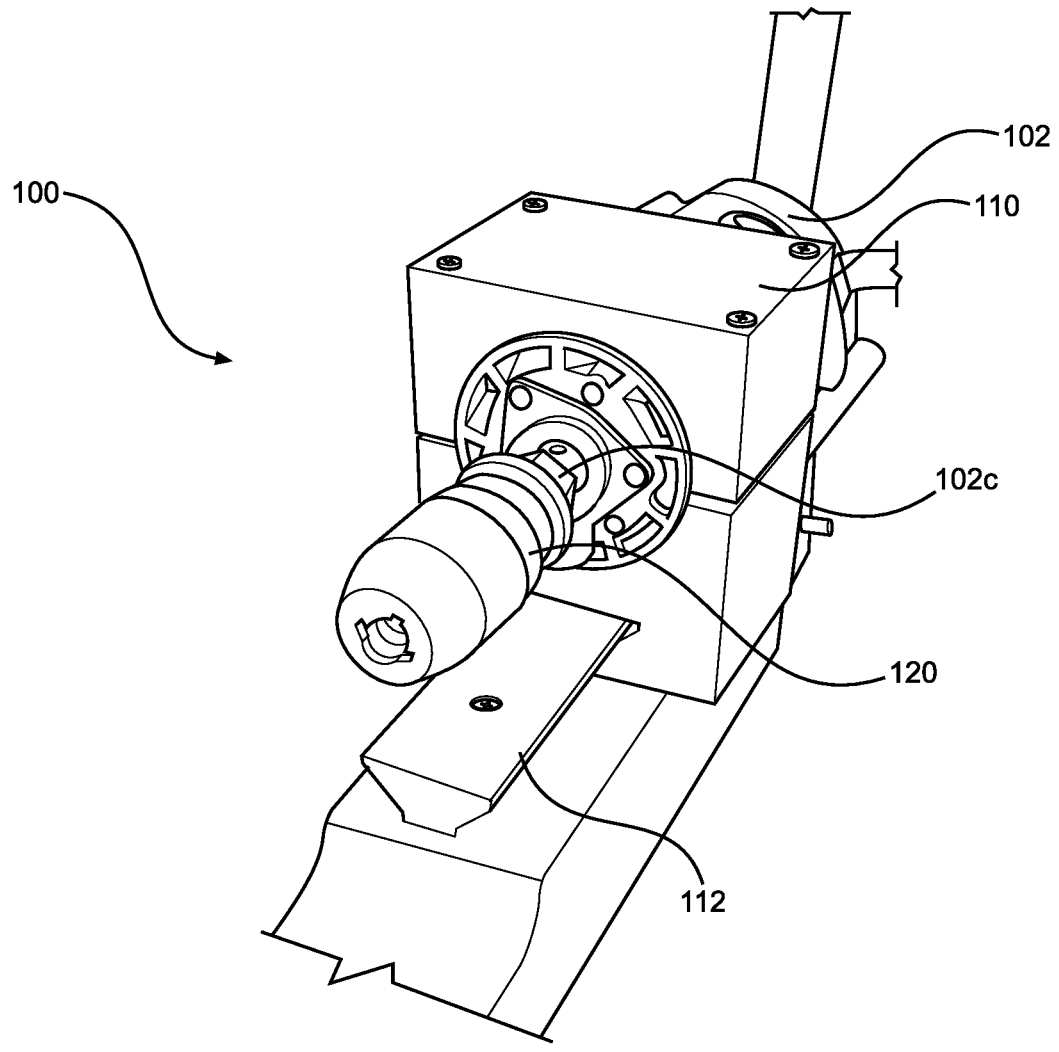
FIG. 5 is a front view of the router sled of FIG. 1 with a chuck attached to the router.
Figure 6:
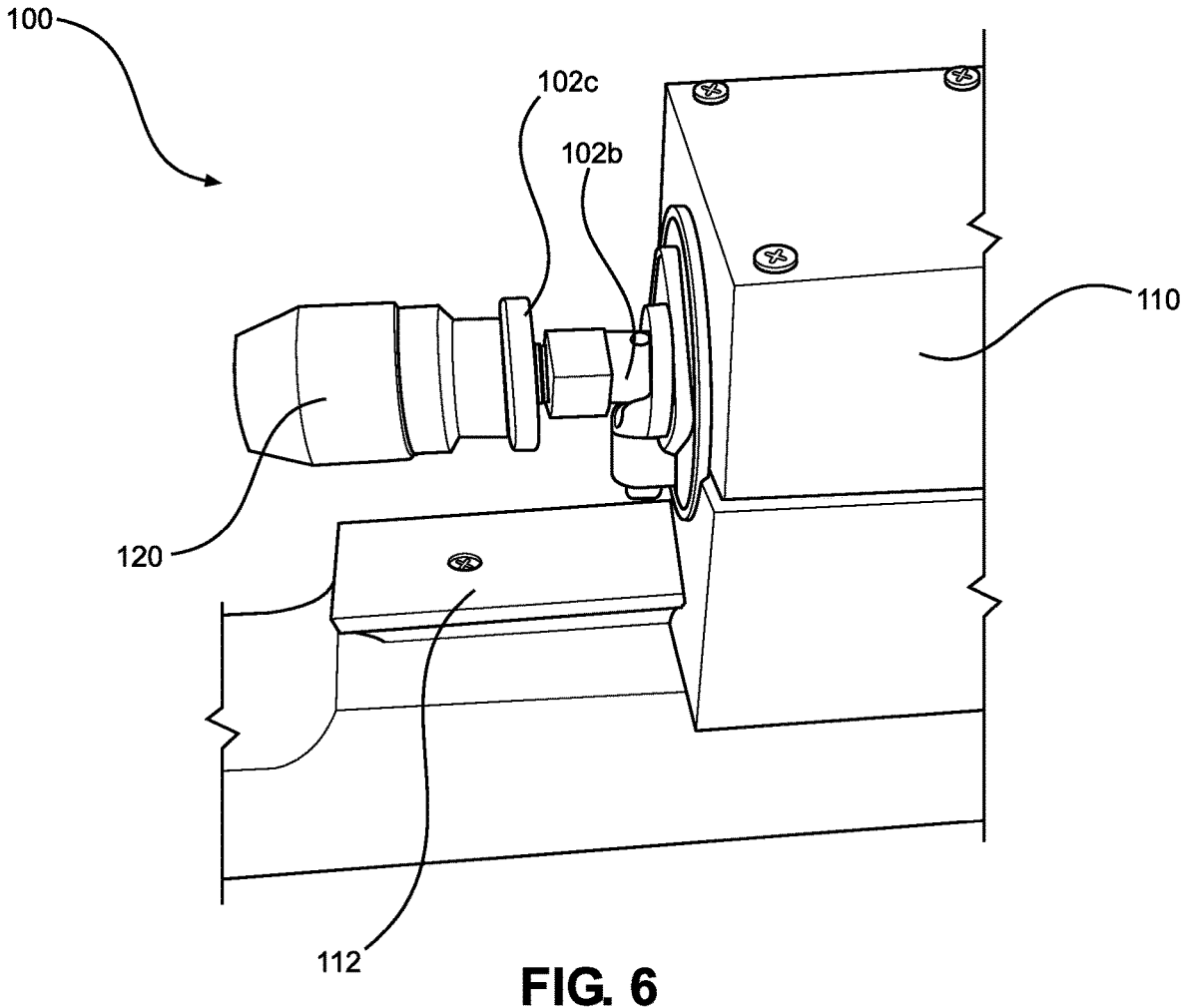
FIG. 6 is a side view of the router sled of FIG. 5.
Figure 8:
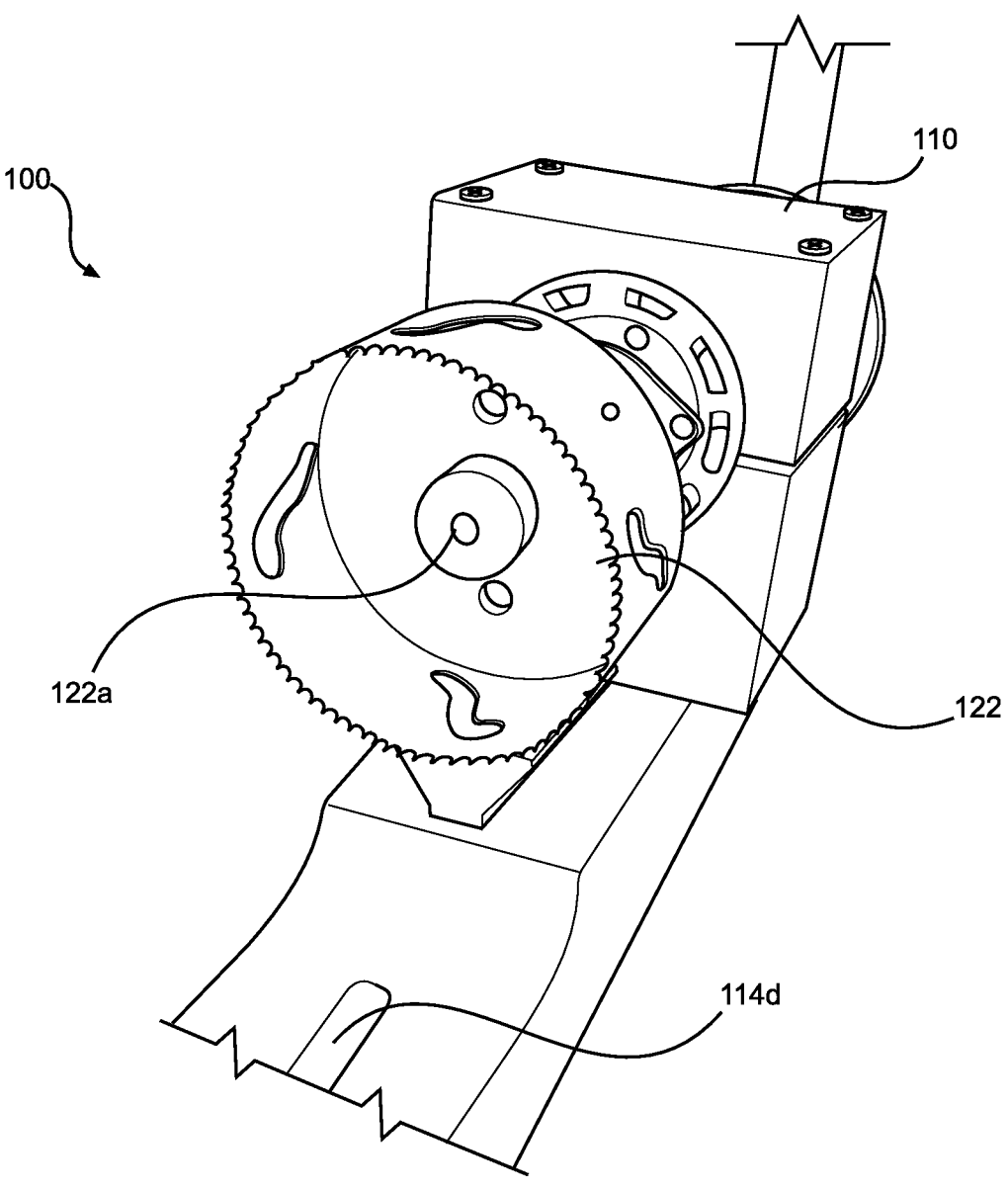
FIG. 8 is a front view of the router sled of FIG. 7.
Figure 9:
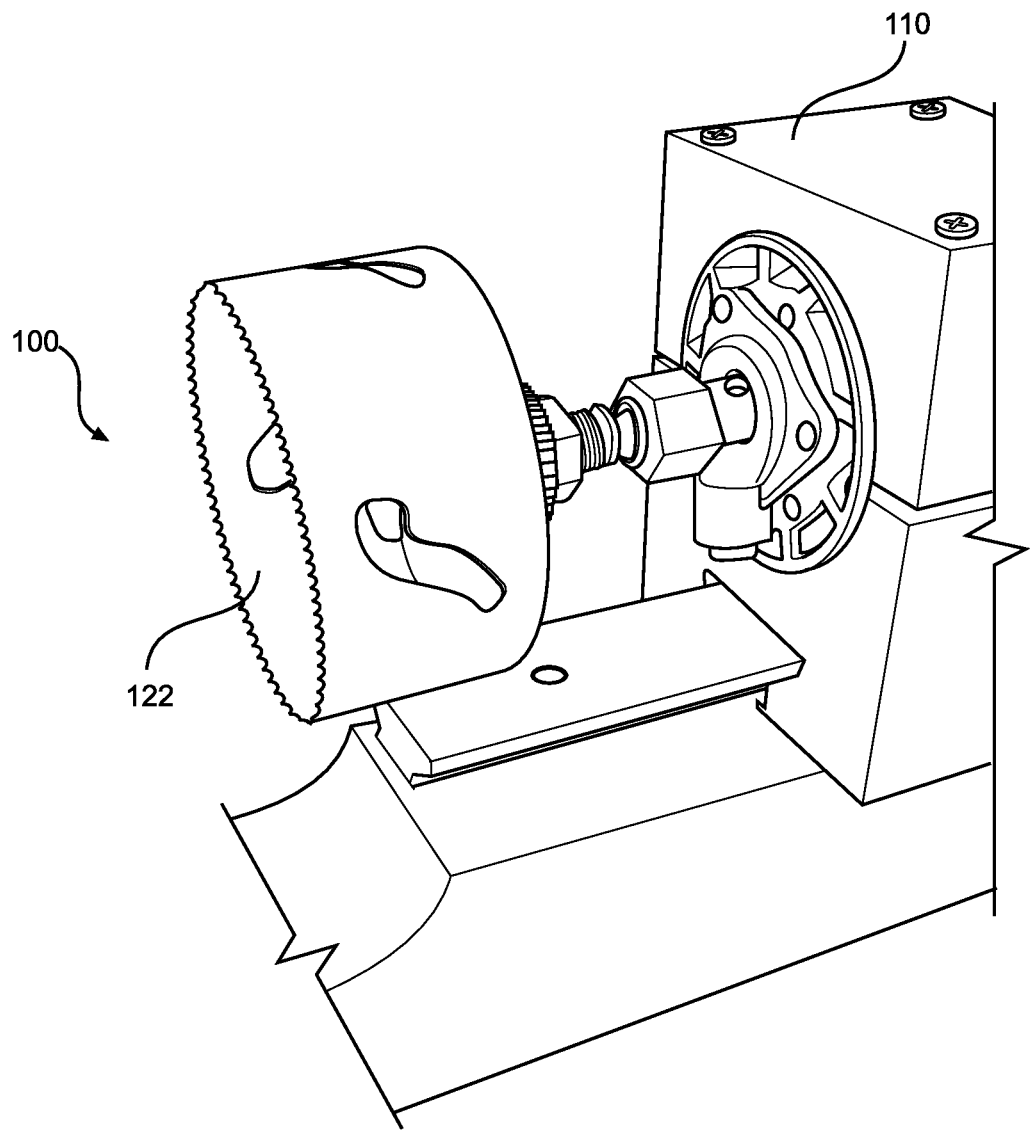
FIG. 9 is a side view of the router sled of FIG. 7.

Referring to FIGS. 5 and 6, a chuck 120 can attach to the collet 102c of the router 102 and rotate with the shaft 102b of the router 102. The chuck 120 can be used to attach various woodworking tools. The chuck 120 is a traditional chuck and includes jaws which lock various items to the router 102. In most cases, the chuck 120 is used to attach various woodworking tools or attachments to the router 102. The woodworking components rotate with the shaft 102b and are attached to the chuck 120. The woodworking components can be used to consistently produce patterns or features in a workpiece 210 by sliding the housing 110 to the predetermined length as discussed above. One woodworking tool that can be attached to the chuck 120 is a blade 122 (see FIGS. 7-9) to cut into a workpiece 210. The blade 122 in this embodiment is circular. The blade 122 can be attached via the chuck 120 or directly to the collet 102c depending on the size and configuration of the blade 122. In some examples, the blade 122 has a blade plug 122a which fits into the collet 102c allowing the blade 122 to attach directly to the collet 102c. As discussed earlier, different tools can be attached to the chuck 120 or collet 102c depending on the desired use.

Figure 7:
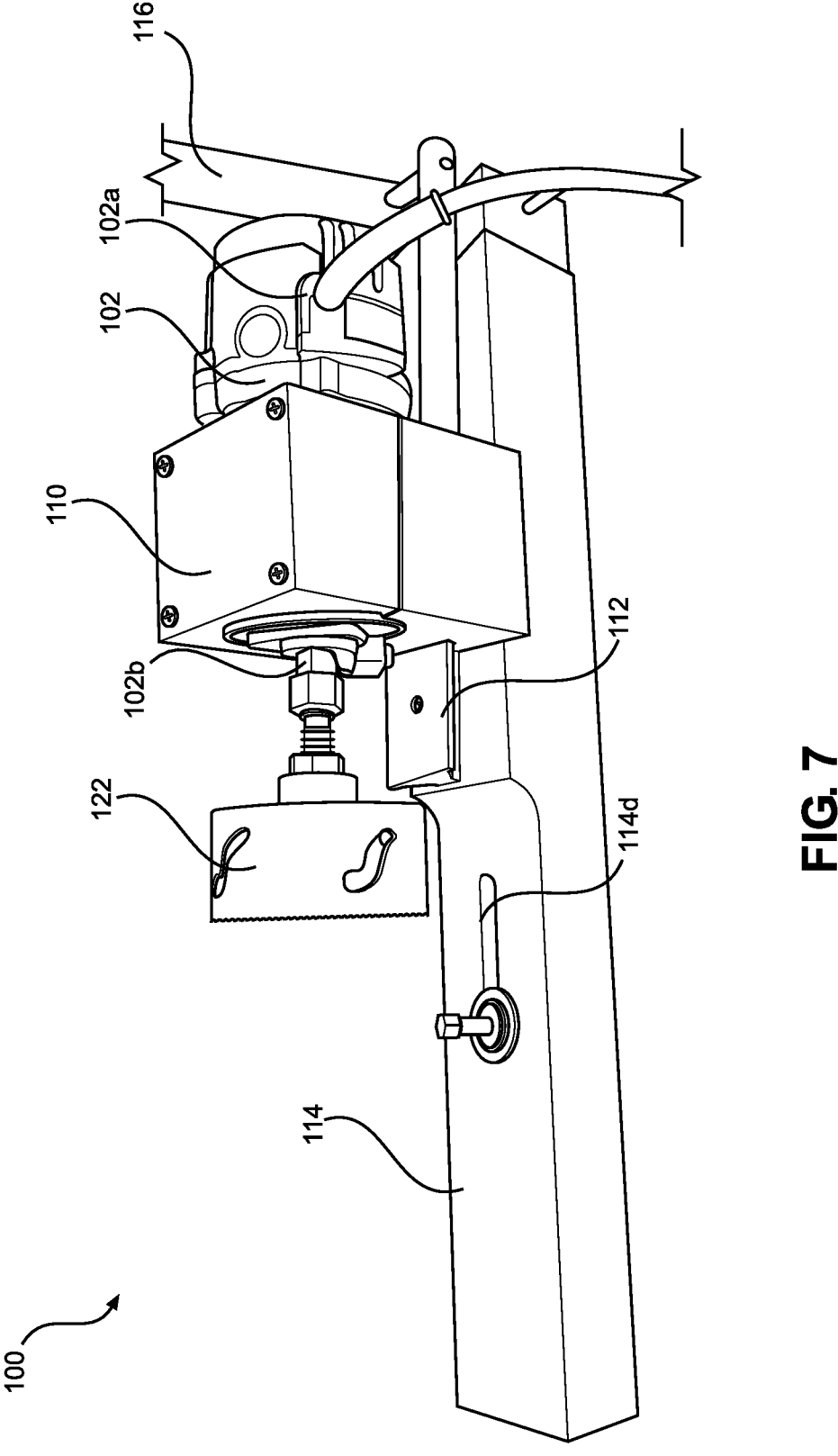
FIG. 7 is a side view of the router sled of FIG. 1 with a blade attached to the router.

The platform 114 additionally includes a mounting location 114d (see FIGS. 1 and 7). The mounting location 114d can be used to mount the router sled 100 to a work bench or other item. The mounting location 114d is positioned in front of the first end 112a of the rail 112. The mounting location 114d is also offset from the rail 112 in a direction perpendicular to the platform axis 114c. In this way, the mounting location 114d is away from the rail 112 such that the router 102 can slide over the mounting location 114d as the router 102 slides with the housing 110.

Figure 10:
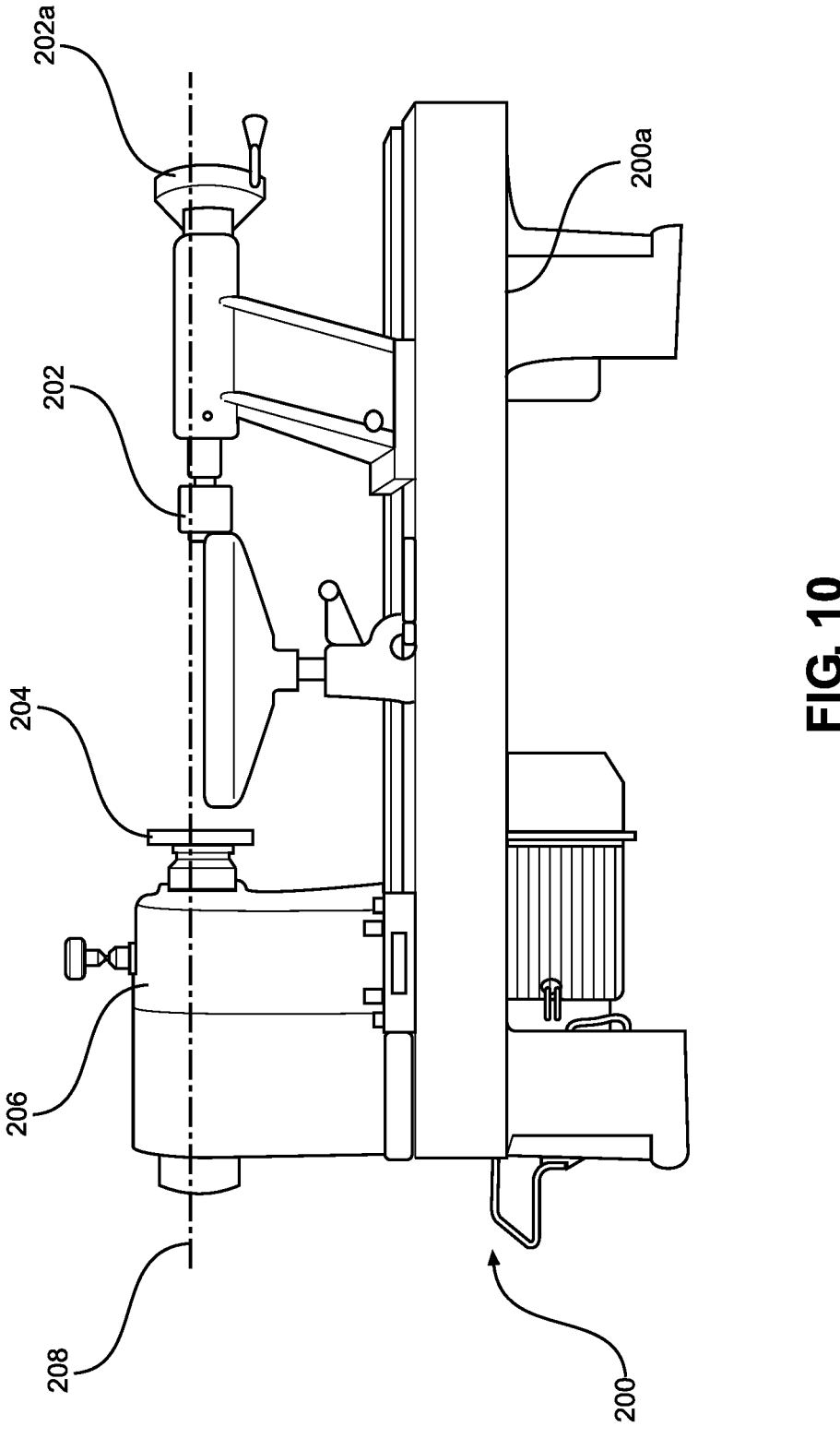
FIG. 10 is view of a lathe in accordance with the principles of this disclosure.

In another aspect, the router sled 100 can be mounted to a lathe 200 with the mounting location 114d. An example lathe 200 is shown in FIG. 10. The lathe 200 includes a tailstock 202 and a chuck 204. The chuck 204 is attached to a lathe motor 206 that is configured to rotate the chuck 204. The chuck 204 is configured to hold a first end of a workpiece 210 and the tailstock 202 is configured to hold a second end of the workpiece 210. The chuck 204 rotates the workpiece 210 and allows users to carve patterns or designs into the workpiece 210. The tailstock 202 is attached to a tailstock handle 202a that can adjust the tailstock 202 length depending on the size of the workpiece 210. The lathe 200 additionally includes a lathe axis 208, the lathe axis 208 extending between the tailstock 202 and the chuck 204. When a workpiece 210 is mounted to the lathe 200, it is mounted such that a workpiece axis is coaxial with the lathe axis 208. The lathe 200 and the various components of the lathe 200 are supported by a lathe base 200a. The lathe base 200a extends parallel to the lathe axis 208.

Figure 11:
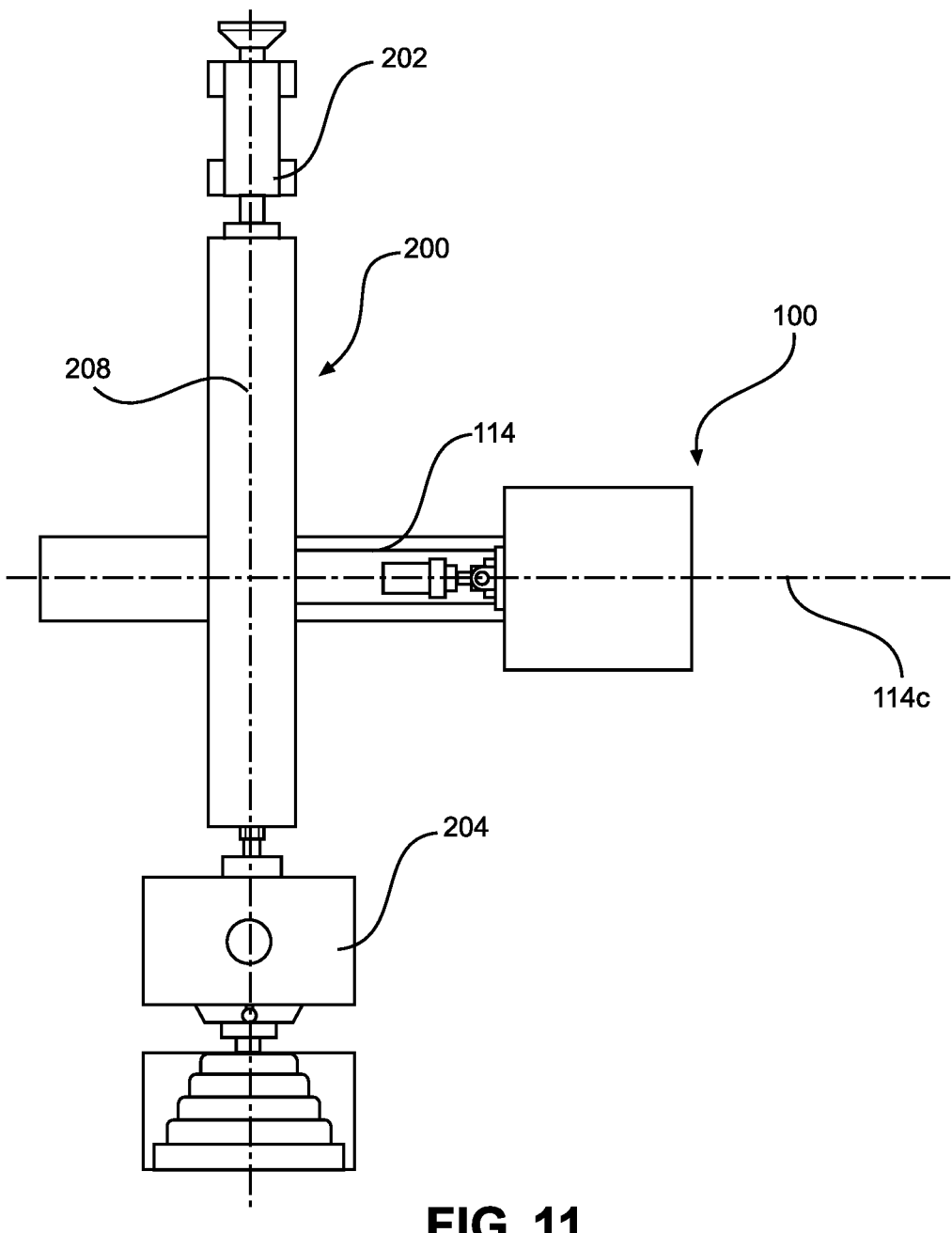
FIG. 11 is a schematic plan view of the router sled of FIG. 1 mounted to the lathe of FIG. 10.

FIG. 11 shows a schematic top view of how the router sled 100 can be mounted to the lathe 200. The router sled 100 is mounted such that the platform 114 and platform axis 114c are perpendicular to the workpiece 210 and the lathe axis 208. The router sled 100 is mounted such that the housing 110 can move up to the workpiece 210 such that the tool mounted to the collet 102c or chuck 120 (depending on the router sled 100 configuration) can make contact with the workpiece 210 to make a pattern or feature within the workpiece 210 as the workpiece 210 is rotated by the lathe 200.

Figure 14:
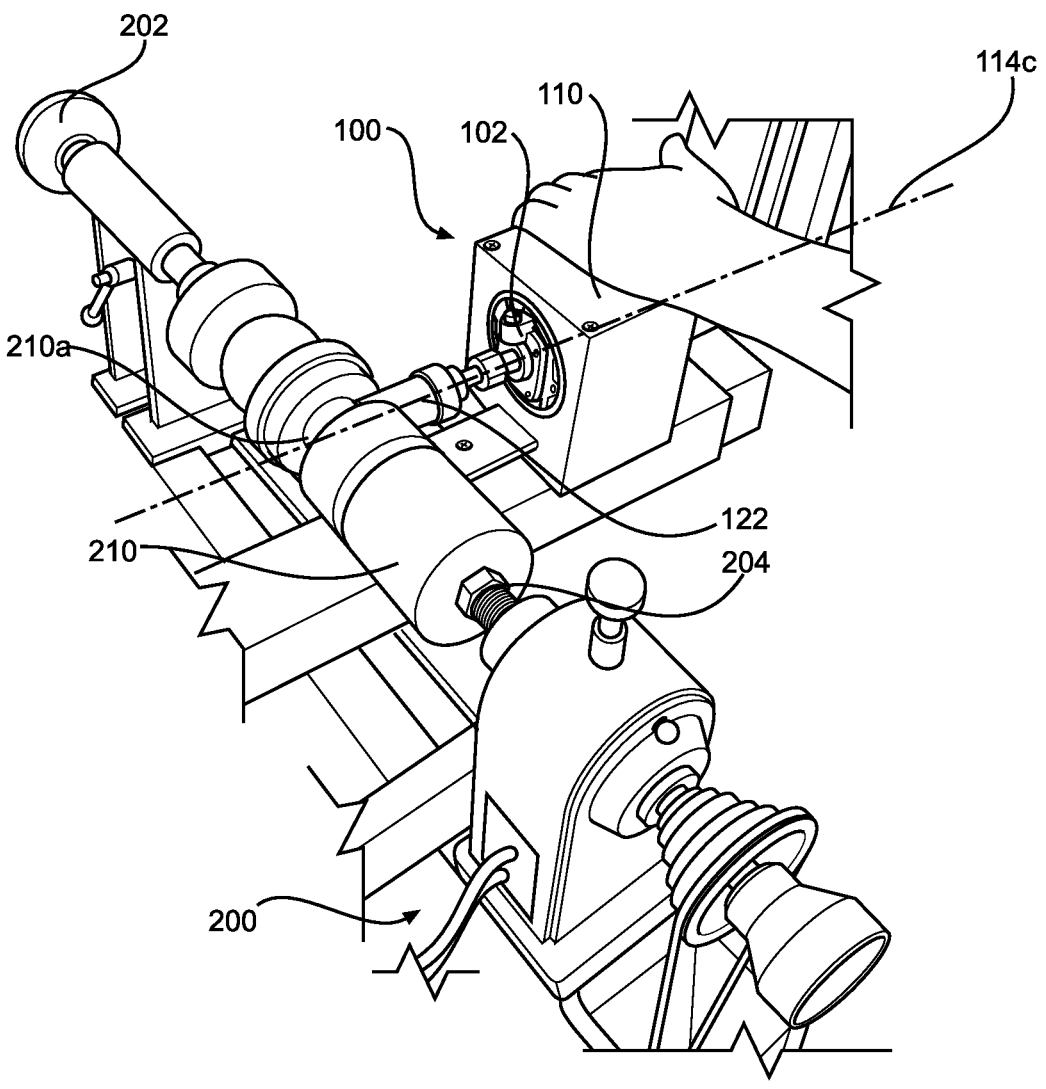
FIG. 14 is a view of a third step of making a sphere using the router sled of FIG. 1 on a workpiece, the workpiece being mounted to a lathe.
Figure 15:
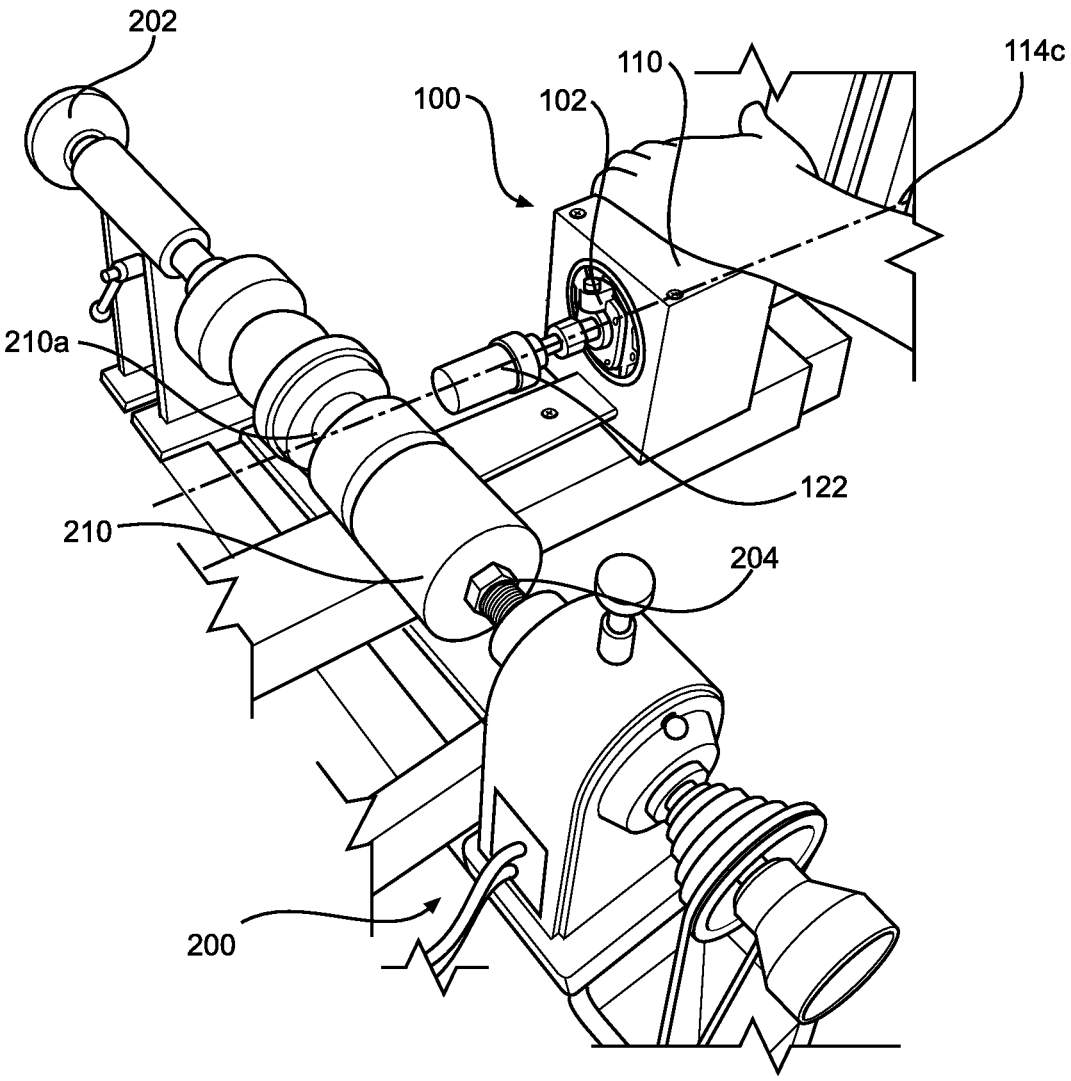
FIG. 15 is a view of a fourth step of making a sphere using the router sled of FIG. 1 on a workpiece, the workpiece being mounted to a lathe.
Figure 16:
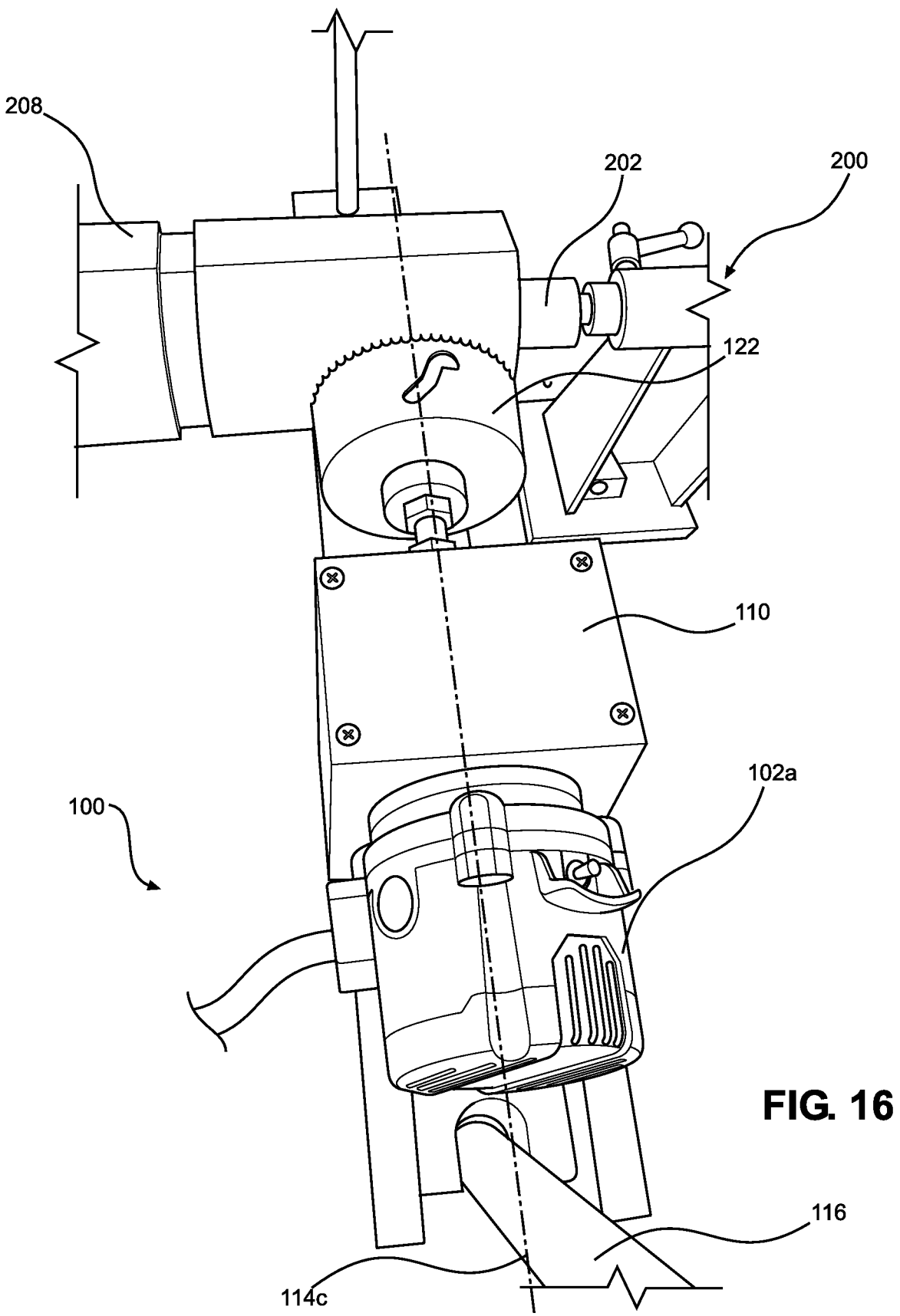
FIG. 16 is a view of a first step of making a sphere using the router sled of FIG. 1 on a workpiece, the workpiece being mounted to a lathe.
Figure 17:
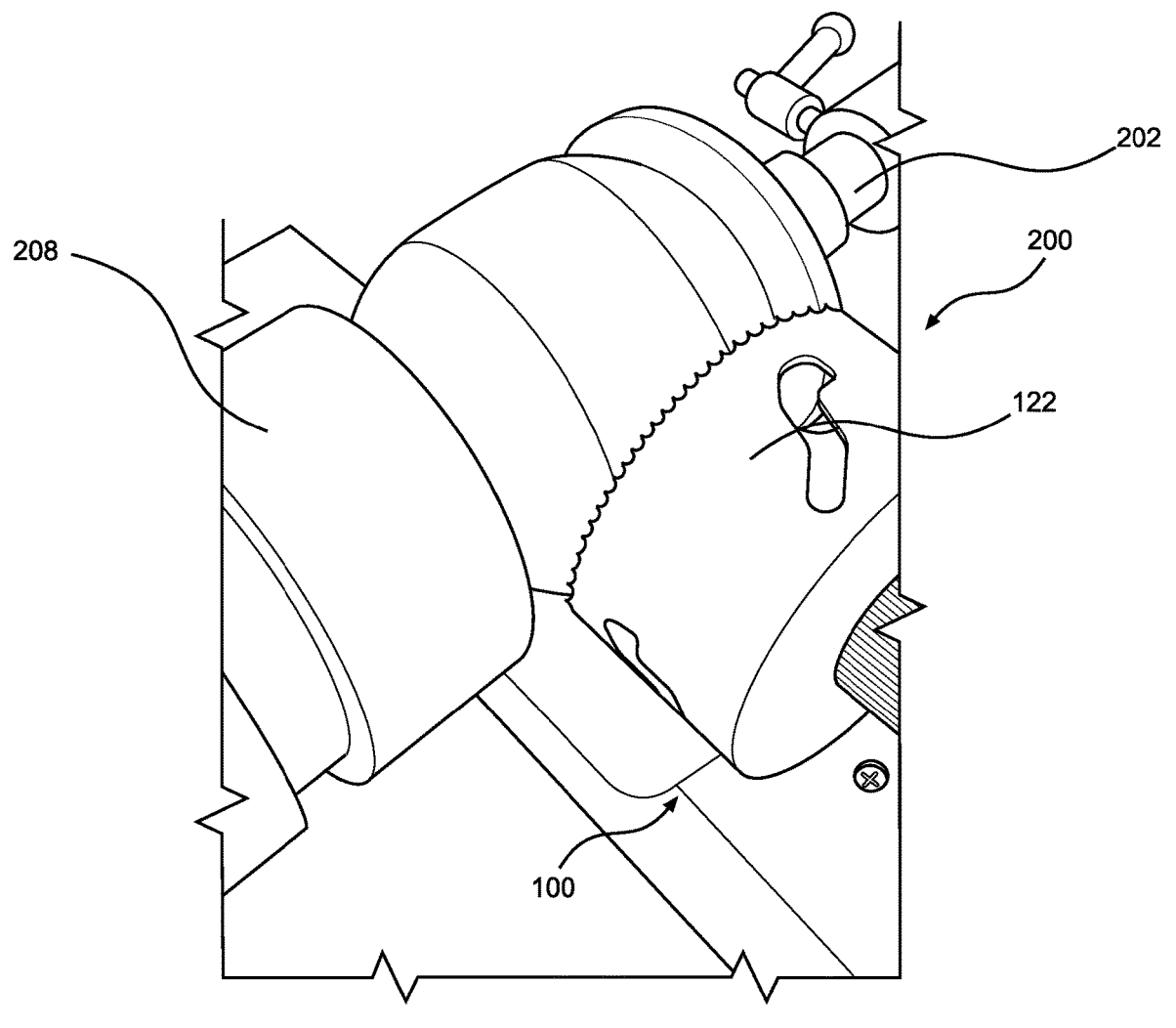
FIG. 17 is a view of a second step of making a sphere using the router sled of FIG. 1 on a workpiece, the workpiece being mounted to a lathe.

Another aspect of the present disclosure relates to creating spherical shapes (e.g., partial spheres integral to the workpiece, referred to hereinafter as spheres except where otherwise indicated) in the workpiece 210. FIGS. 12-15 show one method of creating a sphere 210a in a workpiece 210 without the handle 116 on the router sled 100, and FIGS. 16 and 17 show a different method of creating a sphere 210a on the workpiece 210 with the handle 116 on the router sled 100. When making the sphere 210a, the blade 122 is connected to the router 102 (e.g., via the collet or the chuck). Different diameter blades will produce different sized spheres in the workpiece 210.

Figure 12:
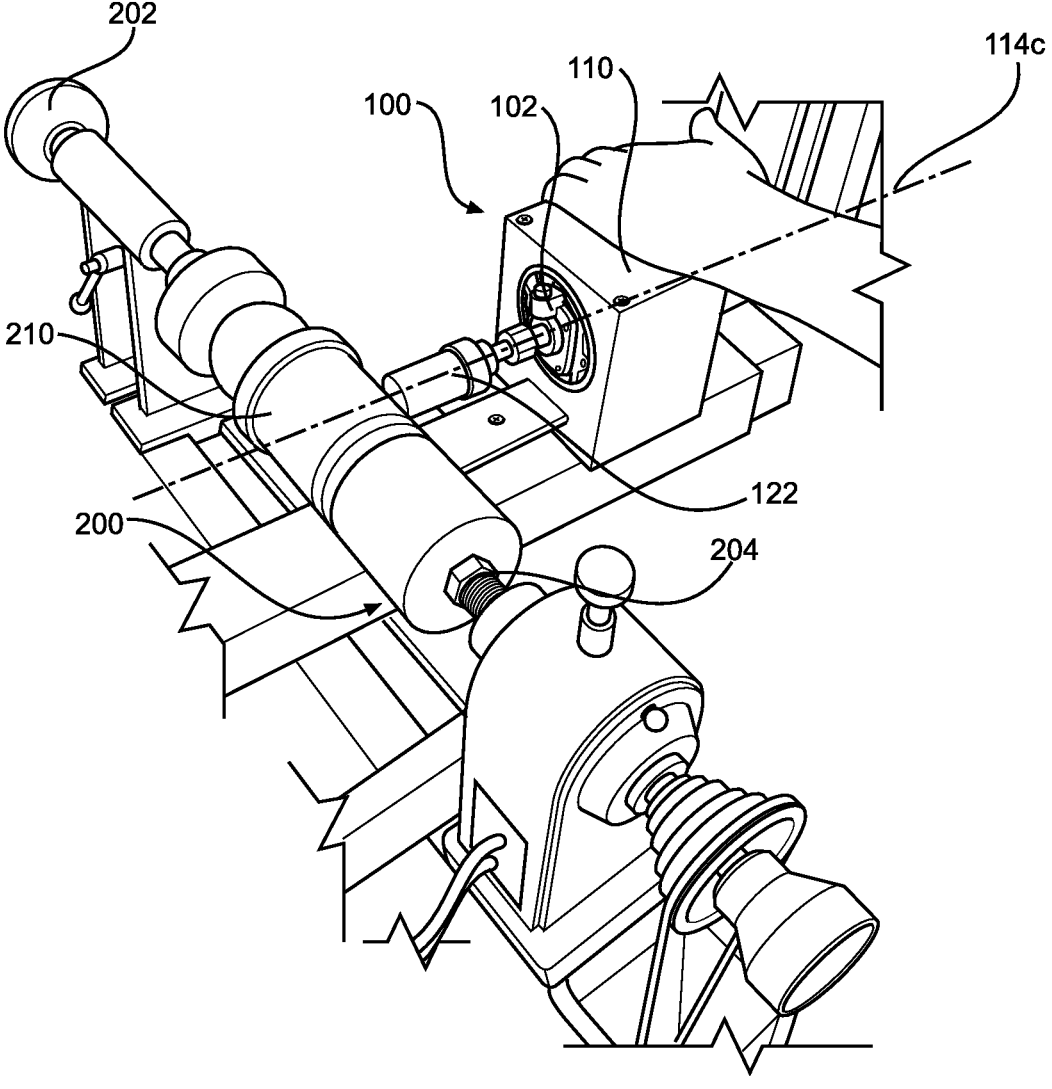
FIG. 12 is a view of a first step of making a sphere using the router sled of FIG. 1 on a workpiece, the workpiece being mounted to a lathe.
Figure 13:
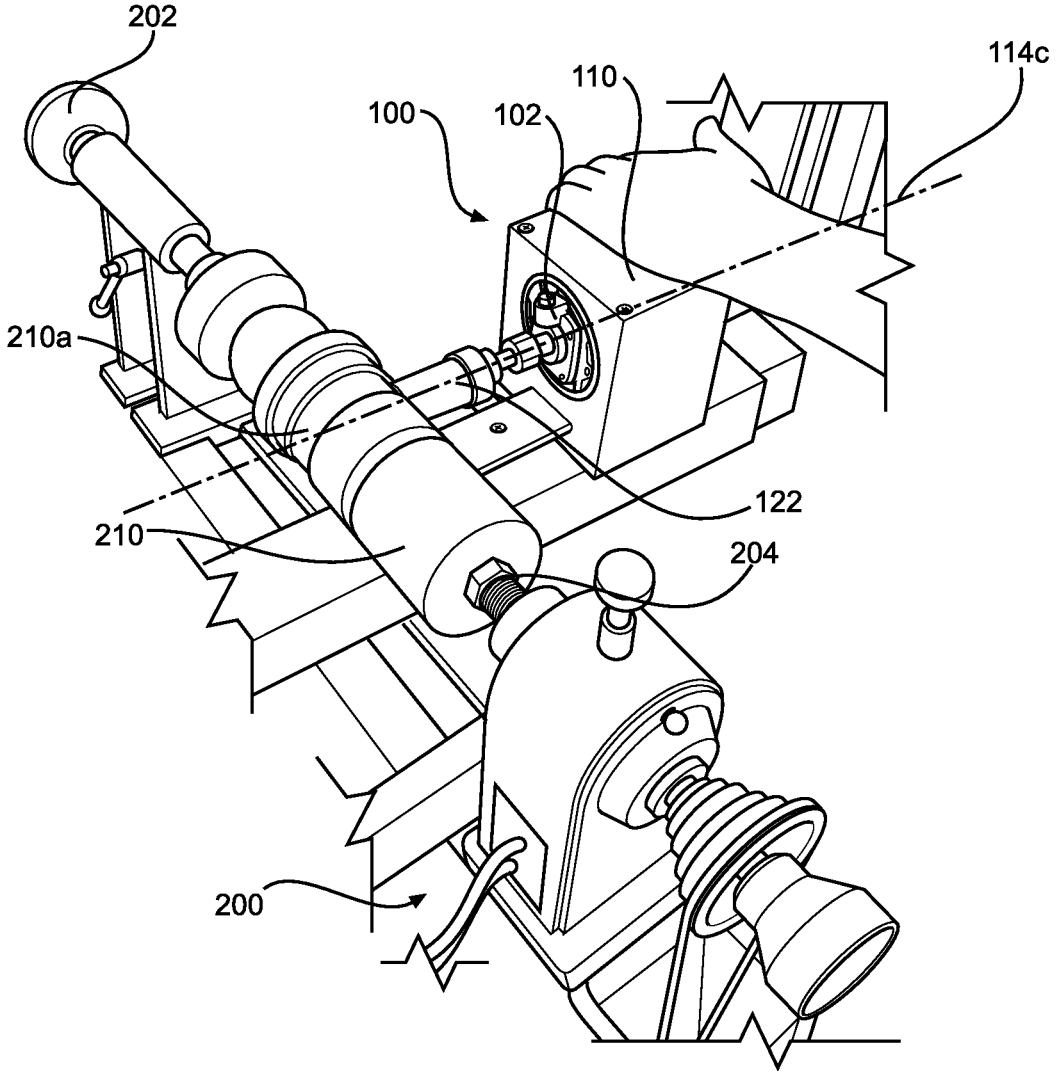
FIG. 13 is a view of a second step of making a sphere using the router sled of FIG. 1 on a workpiece, the workpiece being mounted to a lathe.

Referring to FIG. 12, the blade 122 is attached to the router 102. The lathe 200 is turning the workpiece 210 and the router 102 is rotating the blade 122. FIG. 13 shows a user pushing the housing 110 axially along the platform axis 114c towards the workpiece 210. The blade 122 is beginning to make contact with the workpiece 210, and a sphere 210a is beginning to be formed on the workpiece 210. FIG. 14 shows the blade 122 being pushed by the user further towards workpiece 210. The sphere 210a is now smaller than in FIG. 13 and closer to being fully formed. FIG. 15 shows the sphere 210a is now completely formed and the user has moved the housing 110 axially along the platform axis 114c away from the workpiece 210. After (or before) the sphere 210a is formed, other attachments can be attached to the router 102 and the router sled 100 to create other decorative or functional appearance alterations.

Referring now to FIG. 16, the housing 110 includes the handle 116. The handle 116 is in a retracted position. The router 102 is rotating the blade 122 and the workpiece 210 is being rotated by the lathe 200. The handle 116 is pushed and pivots as discussed earlier. As the handle 116 pivots, the handle arms 116b and the housing 110 move axially towards the workpiece 210 and push the blade 122 until it makes contact with the workpiece 210. The predetermined length, discussed above, can determine the depth of the sphere 210a in the workpiece 210. FIG. 17 shows the sphere 210a completed in the workpiece 210. The handle 116 has been pushed forward and retracted slightly to show the sphere 210a.

Figure 18:
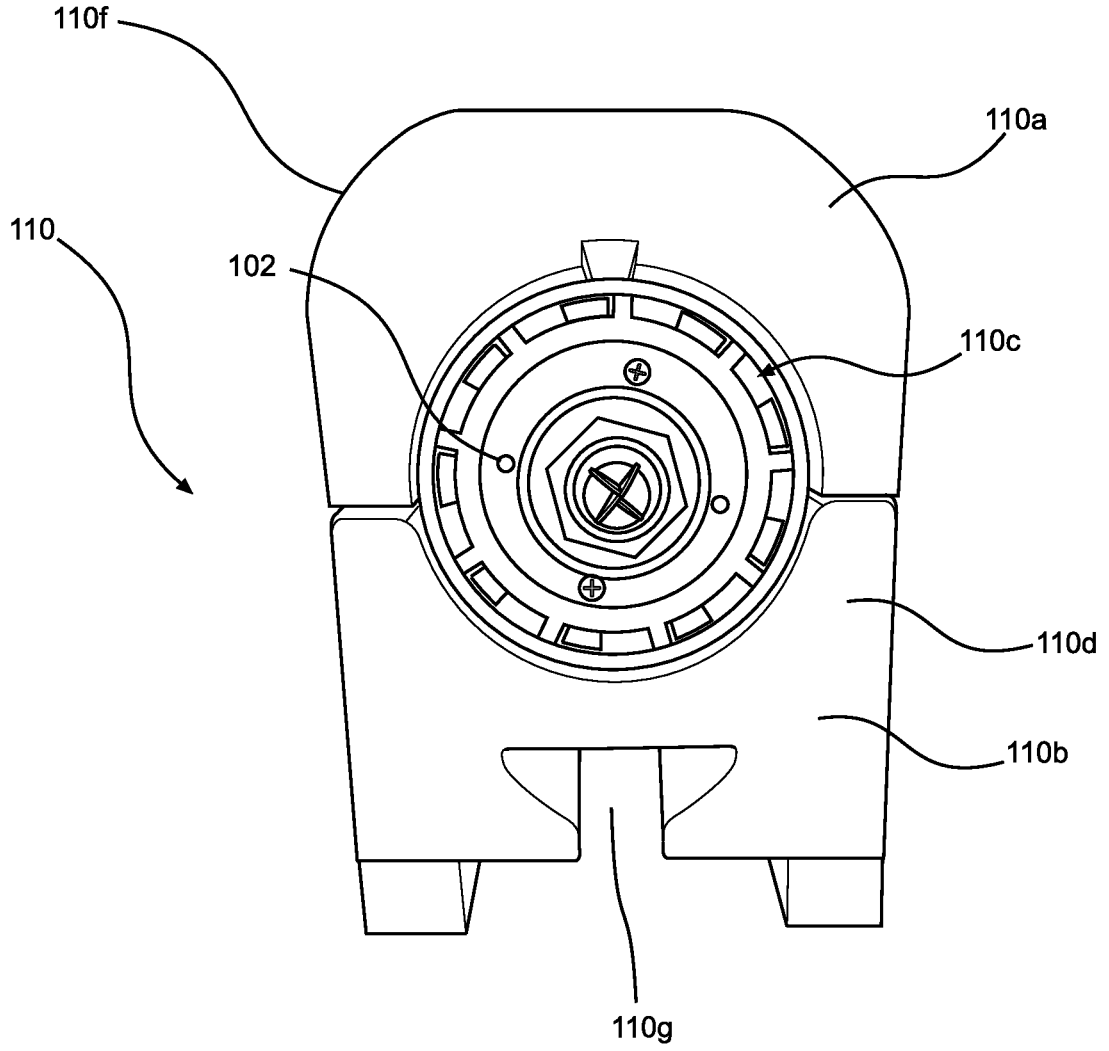
FIG. 18 is a front view of a second example of a housing usable with the with the router of the router sled of FIG. 1, with a router attached to the housing.
Figure 19:
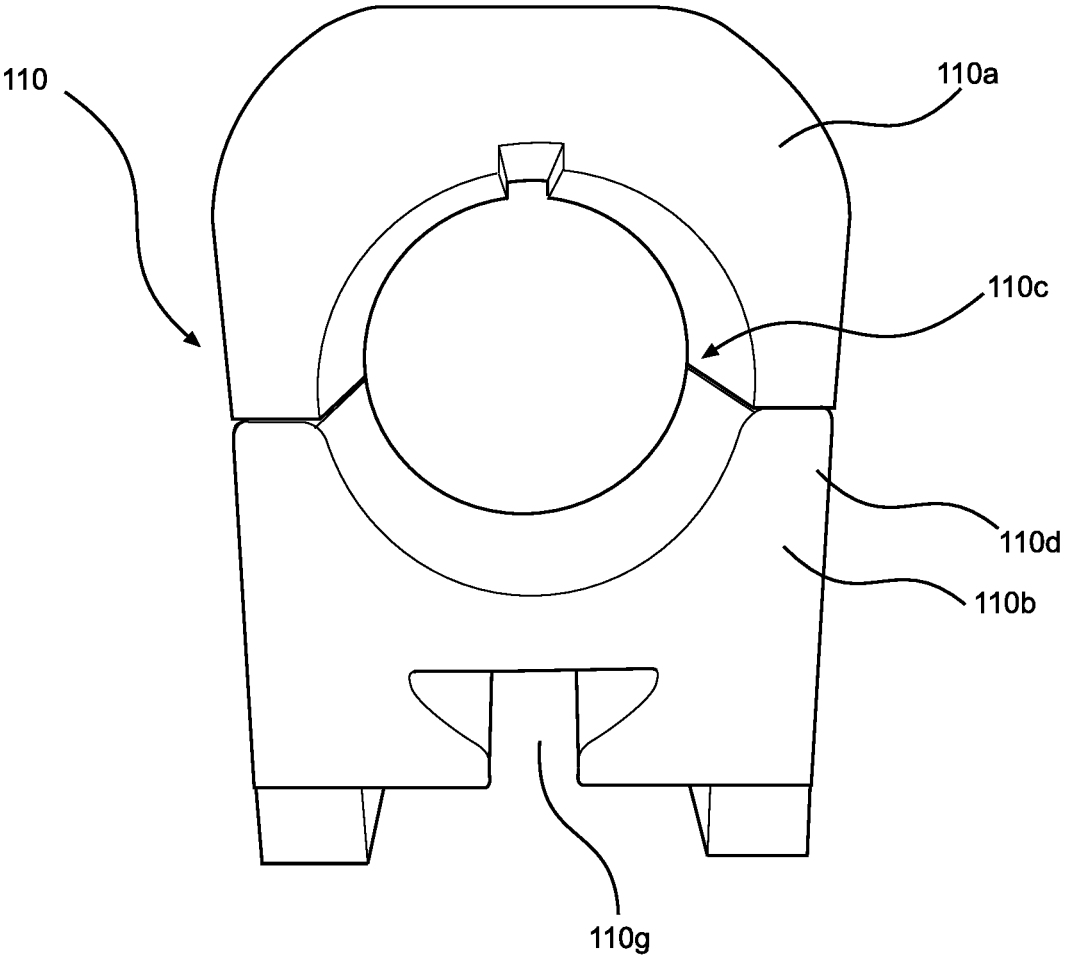
FIG. 19 is a front view of the housing of FIG. 18 in isolation.
Figure 20:
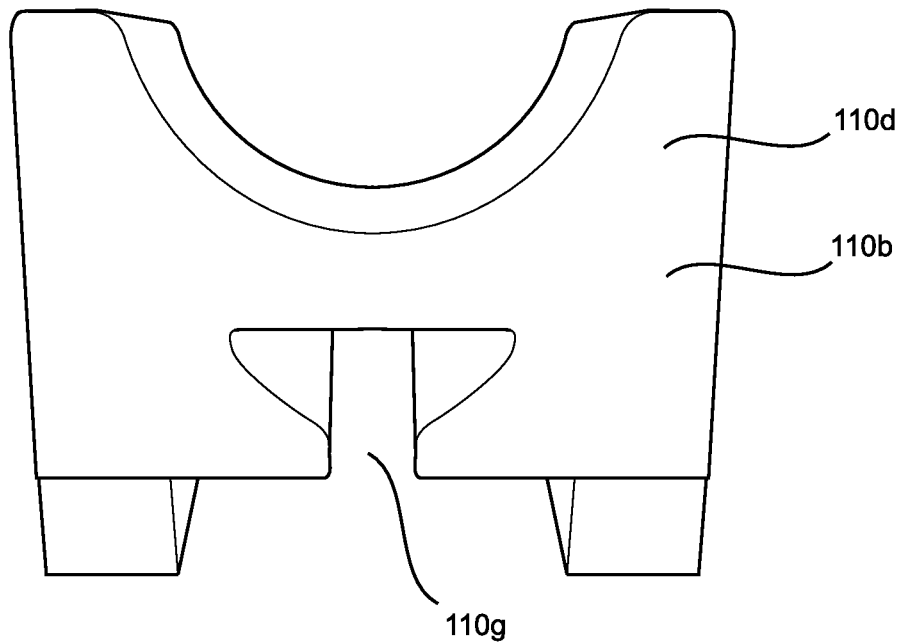
FIG. 20 is a front view of a second piece of the housing of FIG. 18 in isolation.

FIG. 18 shows a second example of the housing 110 with the router 102 attached. The housing 110 is similar to the housing 110 shown in FIGS. 12-15 and is usable in conjunction with the above-described assembly and features. In one aspect, the first piece 110a includes curved sides 110f to allow for ease of holding and pushing the housing 110 without the use of the handle 116. FIG. 19 shows the housing 110 without the router 102 included. FIG. 20 shows the second piece 110b in isolation.

Figure 21:
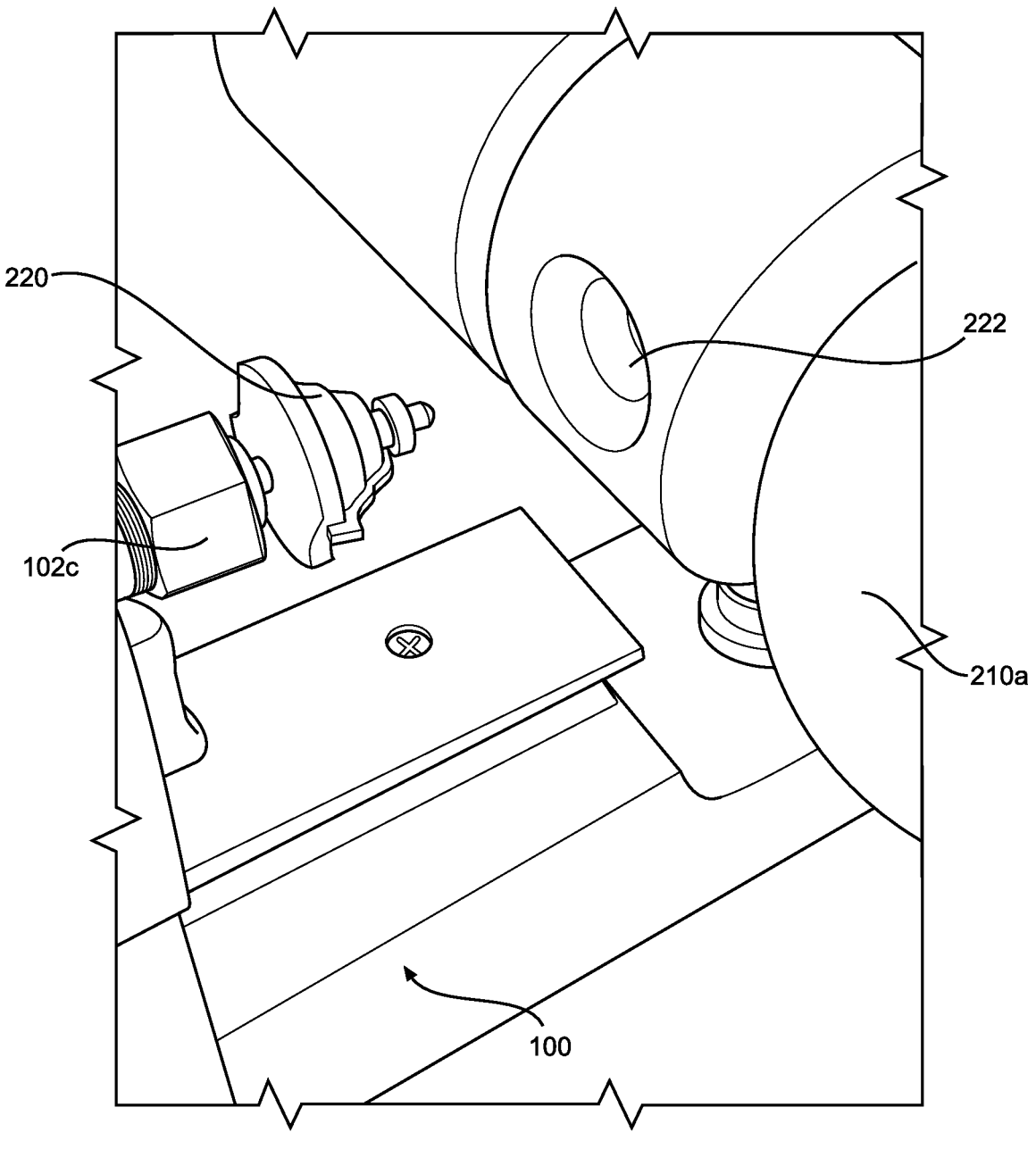
FIG. 21 is a side view a bit for drilling holes in a workpiece attached to the router in the router sled of FIG. 1.
Figure 22:
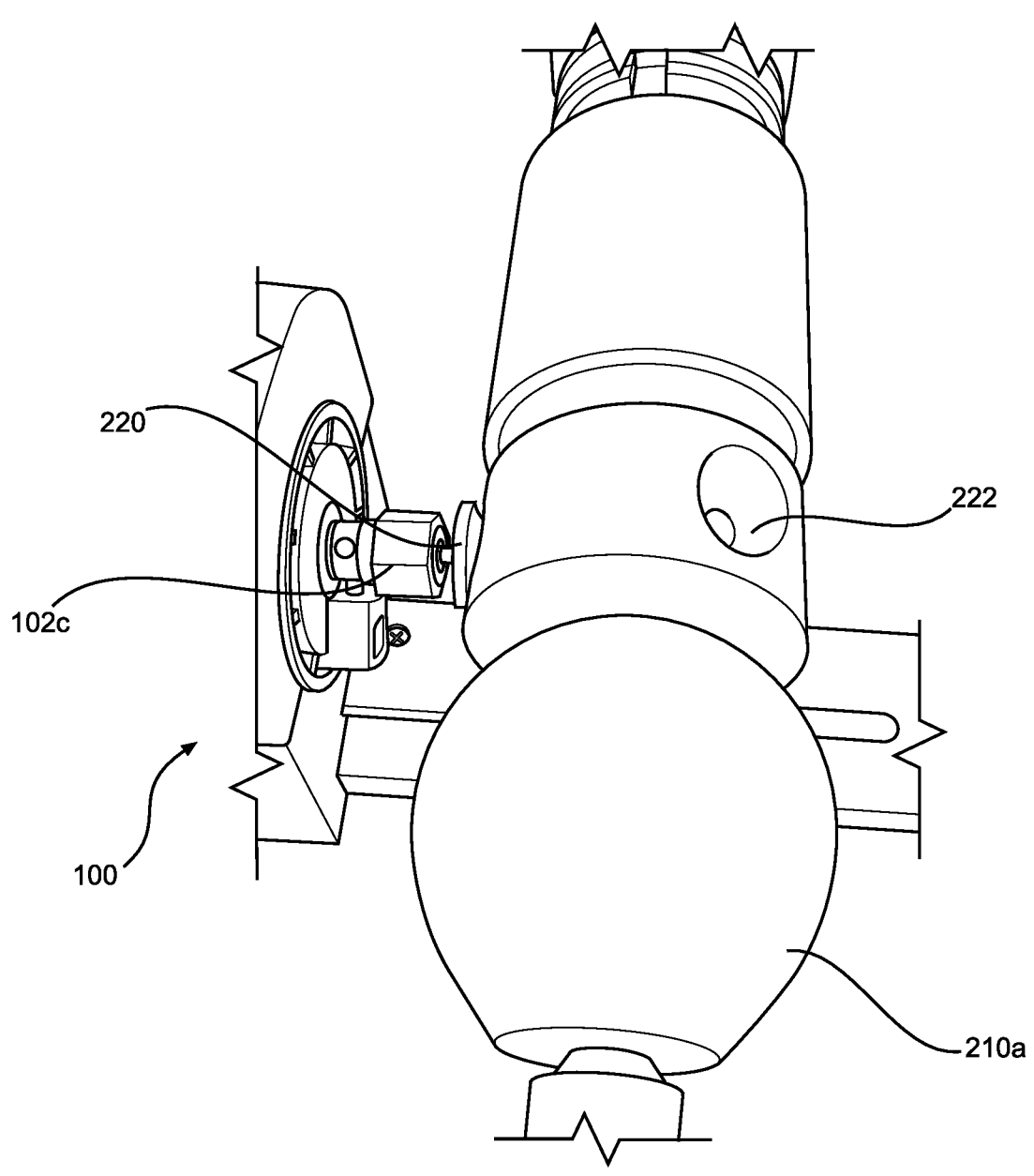
FIG. 22 is a front view of the drill bit drilling a hole in the workpiece of FIG. 21.
Figure 23:
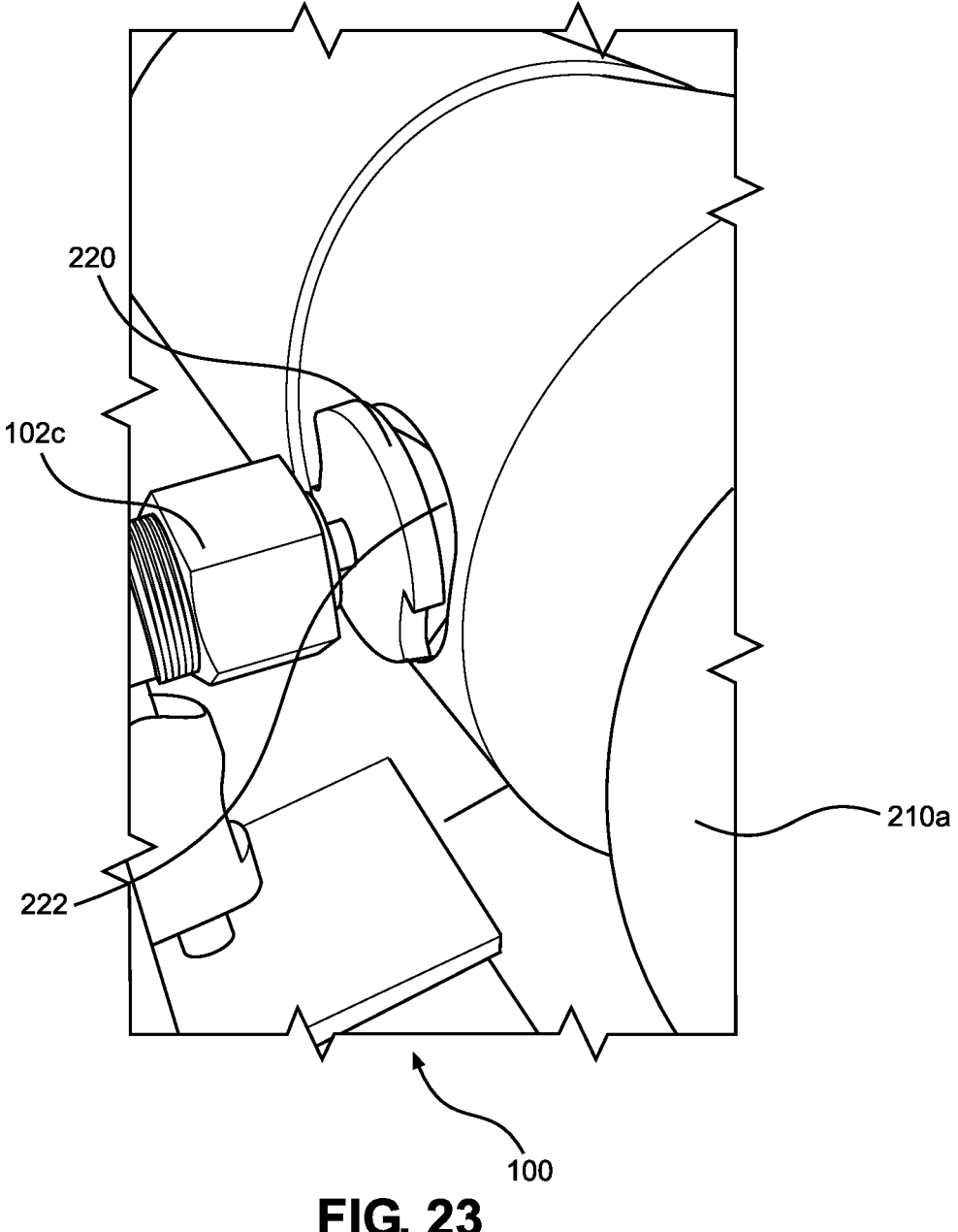
FIG. 23 is a view of the bit of FIG. 21 with the bit in a hole of the workpiece.

FIGS. 21-23 show a bit 220 (e.g., a drill bit or a router bit) attached to the collet 102c of the router 102 after the sphere 210a has been made. The bit 220 is positioned axially on the workpiece axis adjacent to the sphere 210a (e.g., above or below). The bit 220 can be used when the lathe 200 is not turning the workpiece 210 to create holes 222 which are spaced equally about the workpiece 210 adjacent the sphere 210a. The holes 222 can be made at various angles depending on the desired appearance. The method of cutting the holes 222 is referred to as plunge cutting. The holes 222 can be made before or after the sphere 210a has been made.

Figure 24:
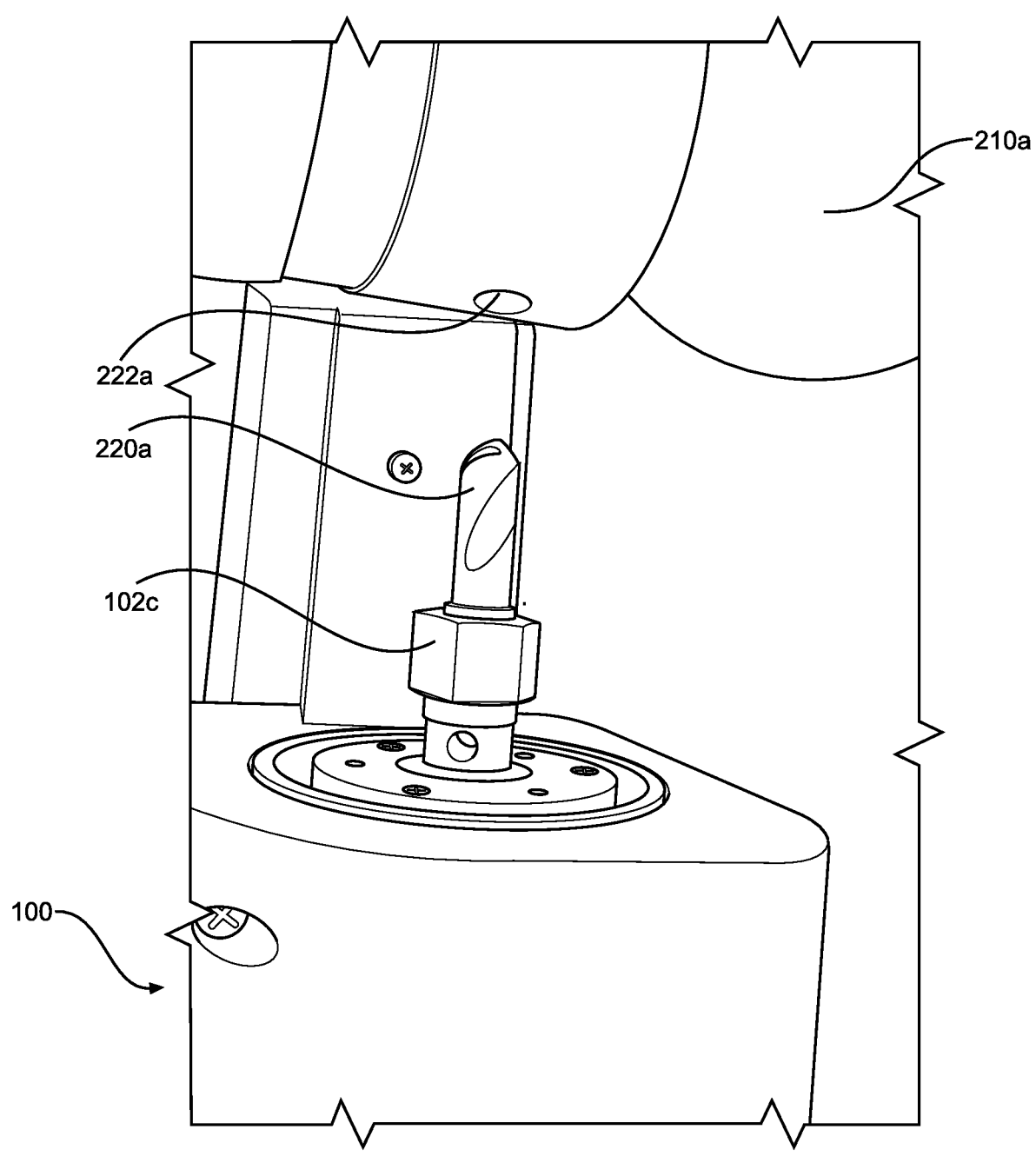
FIG. 24 is a view of the router sled of FIG. 1 with a different bit for creating a hole in the workpiece.
Figure 25:
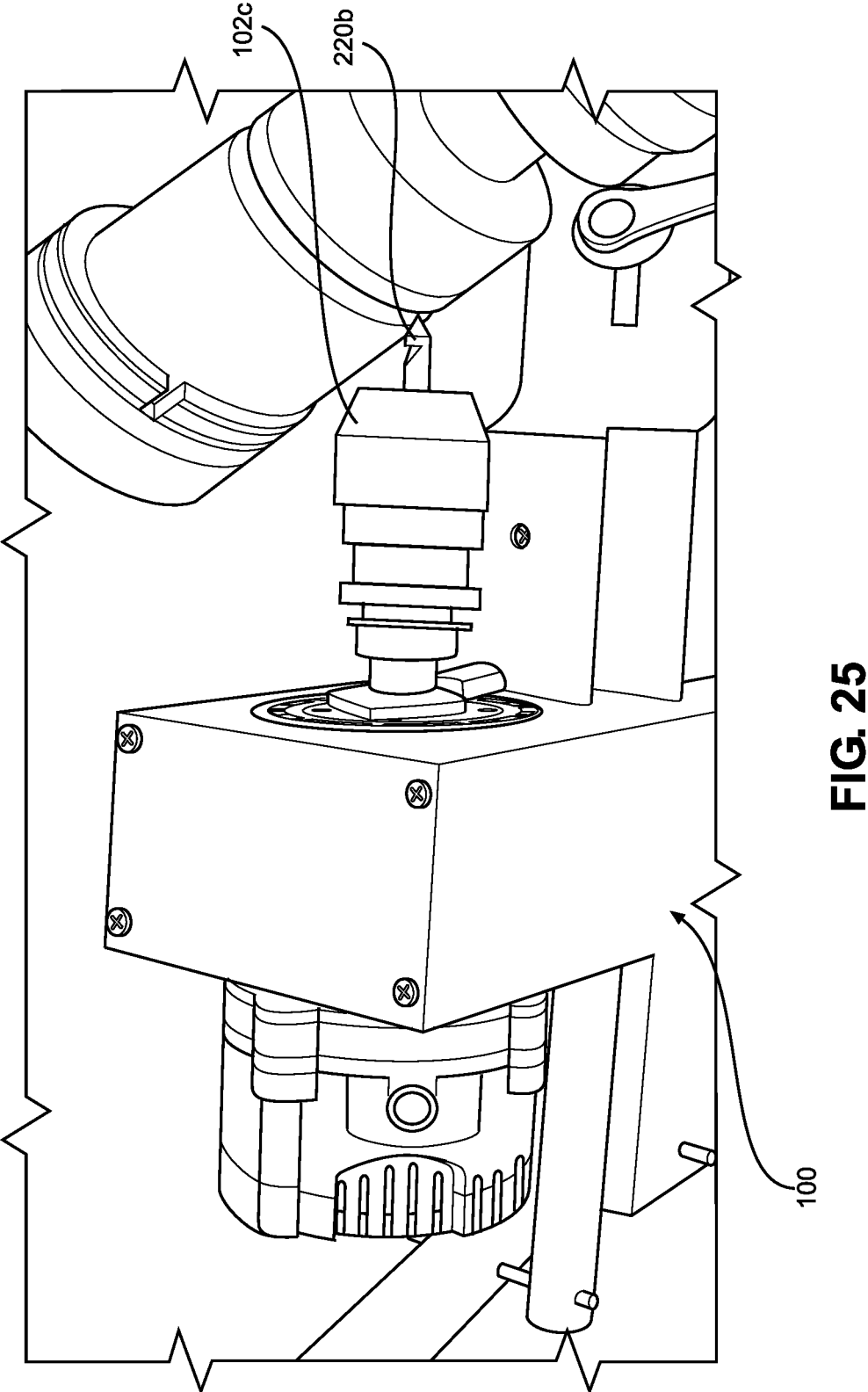
FIG. 25 is a view of the router sled of FIG. 1 with a different bit for creating a hole in the workpiece.

FIG. 24 shows a different bit 220a attached to the collet 102c of the router 102, and FIG. 25 shows a different bit 220b attached to the chuck 120. The bits 220, 220a, 220b can be attached to either the chuck 120 or the collet 102c depending on the type of bit 220 being used. The bits 220, 220a, 220b each create holes 222, 222a with different profiles. The holes 222, 222a are made in similar ways. The bit 220, 220a, 220b is attached to either the collet 102c or the chuck 120, then in a similar way to how the spheres are made, the router sled 100 is pushed axially along the platform axis 114c towards the workpiece 210 until a desired hole depth is reached. Once the desired hole depth is reached, the router sled 100 is pulled axially away from the workpiece 210 along the platform axis 114c. The workpiece 210 can then be rotated a predetermined amount by the lathe 200 and allowing for holes 222, 222a to be cut uniformly around the workpiece 210 to create a desired appearance. Various amounts of holes 222 can be made about the workpiece 210. Typically, as discussed above, the holes 222 are made equally spaced apart and at the same position on the workpiece 210. Additionally, various bits can be used depending on the desired appearance of the final product. The holes made in the workpiece 210 by plunge cutting, before, after, or not in conjunction with the sphere 210a being made. The holes can additionally be made at different angles with respect to the workpiece axis depending on the desired appearance of the final product.

Figure 26:
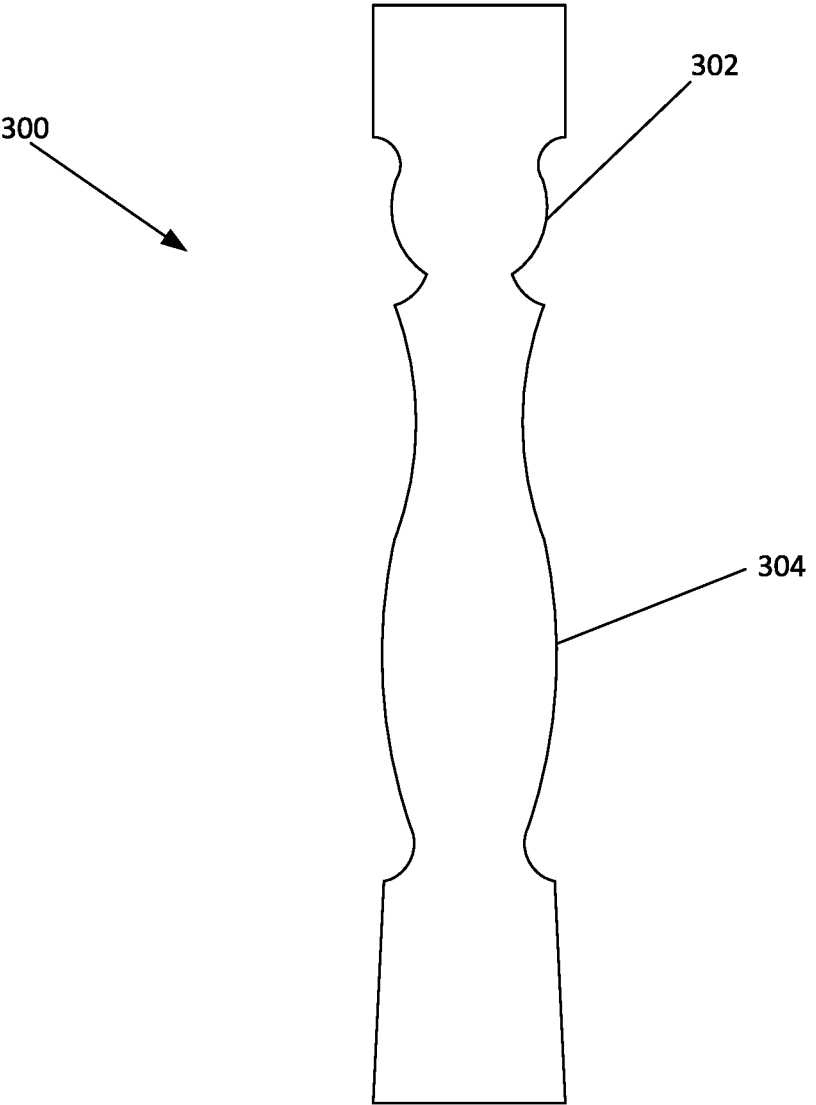
FIG. 26 is a view of a final product made by the router sled of FIG. 1.

FIG. 26 shows an example final workpiece 300. The final workpiece 300 is the workpiece 210 after the cuts have been made creating a railing, newel, or another elongate wood member including a sphere-shaped cut 302. By use of the term "sphere-shaped" it is meant to include articles defining either part of a sphere or the entirety of a sphere. In the example shown in FIG. 27, the cut 302 forms part of a sphere adjoining adjacent portions of the workpiece 300. The final workpiece additionally includes other curved shapes 304 that can also be created by the router sled 100 by changing an angle which the router sled 100 is mounted and controlling the depth along with using various bits attached to the router 102.

Figure 27:
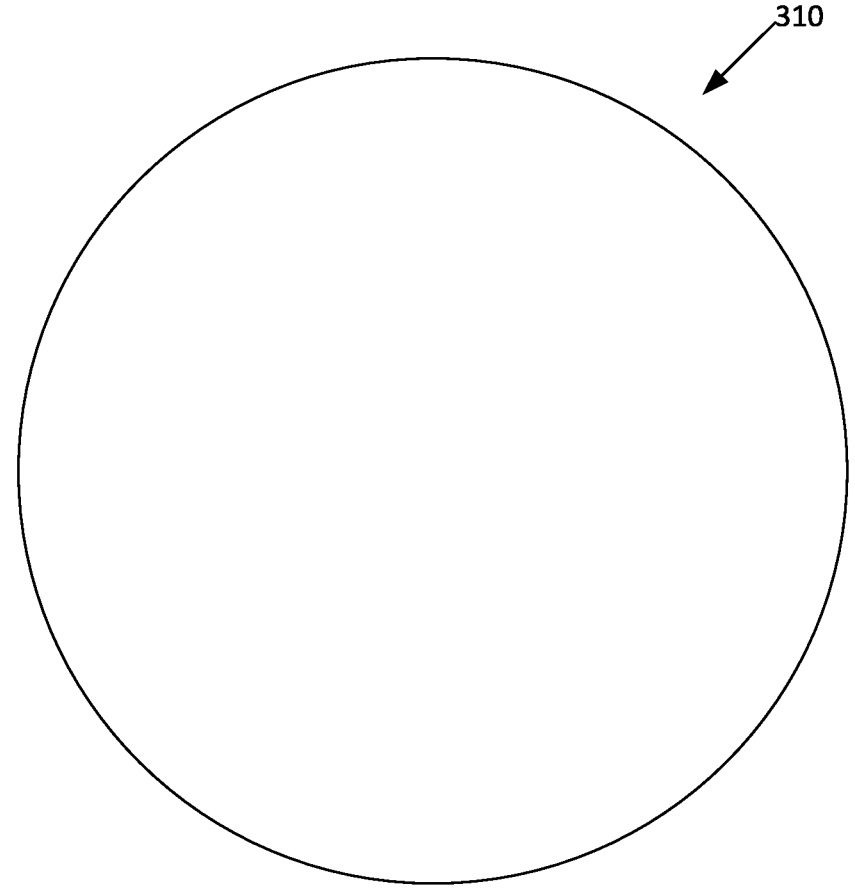
FIG. 27 is a view of a different final product made by the router sled of FIG. 1.

FIG. 27 shows a different final workpiece 310. The final workpiece 310 is a sphere-shaped cut that is a complete sphere. The final workpiece 310 is made by extending moving the router sled 100 completely through the workpiece 210 as the lathe turns the workpiece 210. Different final workpieces can result from different bits, different workpieces, different depths and angles which the router sled approaches the workpiece and various other factors. The final workpieces 300, 310 are non-limiting. In one example a portion of the workpiece 310 can be cut to form a flat side such that the workpiece can be used as a cap on a post.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed:

1. A mechanism for cutting spheres on a workpiece mounted to a lathe, the mechanism comprising:

a router sled comprising a platform, having a first side surface at a first end and a second side surface at a second end and a top surface extending along and defining the platform including a rail that extends along a horizonal platform axis, the platform configured to be mounted to the lathe such that the horizontal platform axis is perpendicular to the workpiece;

a router comprising a motor that rotates a shaft which is attached to a blade; and a router mount including a first piece and a second piece; wherein in the router mount houses the router between the first piece and the second piece and the second piece is slidably connected to the rail so as to allow the router to slide on the rail along the horizontal platform axis; and wherein the router mount further includes:

a pair of handle arms secured to the second piece of the router mount and extending in a direction substantially parallel to the horizontal platform axis; and a handle extending in a direction substantially perpendicular to the horizontal platform axis and being pivotally connected to a handle holder attached to the second side surface at the second end of the platform at a first pivot location, the handle further being connected between the pair of handle arms via a handle pin at a location vertically above the first pivot location and a first pivot axis such that a forward motion on the handle causes rotation of the handle about the first pivot axis, which in turn slides the pair of handle arms and the router mount axially along the rail towards the first end of the platform and towards the workpiece in a linear movement along the horizontal platform axis to cut a sphere out of the workpiece with the blade.

2. The mechanism of claim 1, wherein the blade is circular shaped.

3. The mechanism of claim 1, wherein the blade is removably attached to the shaft.

4. The mechanism of claim 1, wherein a diameter of the sphere that is cut from the workpiece corresponds to the size of the blade.

5. A system for cutting spheres on a workpiece, the system comprising:

a lathe a router sled comprising a platform, having a first side surface at a first end and a second side surface at a second end and a top surface extending along and defining the platform including a rail that extends along a horizonal platform axis, the platform configured to be mounted to the lathe such that the horizontal platform axis is perpendicular to the workpiece;

a router comprising a motor that rotates a shaft which is attached to a blade; and a router mount including a first piece and a second piece; wherein in the router mount houses the router between the first piece and the second piece and the second piece is slidably connected to the rail so as to allow the router to slide on the rail along the horizontal platform axis; and wherein the router mount further includes:

a pair of handle arms secured to the second piece of the router mount and extending in a direction substantially parallel to the horizontal platform axis; and a handle extending in a direction substantially perpendicular to the horizontal platform axis and being pivotally connected to a handle holder attached to the second side surface at the second end of the platform at a first pivot location, the handle further being connected between the pair of handle arms via a handle pin at a location vertically above the first pivot location and a first pivot axis such that a forward motion on the handle causes rotation of the handle about the first pivot axis, which in turn slides the pair of handle arms and the router mount axially along the rail towards the first end of the platform and towards the workpiece in a linear movement along the horizontal platform axis to cut a sphere out of the workpiece with the blade.

\*    \*    \*    \*    \*